United States Patent
Jonsson et al.

(10) Patent No.: US 9,198,079 B2
(45) Date of Patent: Nov. 24, 2015

(54) METHOD AND APPARATUS FOR EQUALIZATION PROCESSING IN A WIRELESS COMMUNICATION RECEIVER

(71) Applicant: Telefonaktiebolaget L M Ericsson (publ), Stockholm (SE)

(72) Inventors: Elias Jonsson, Malmö (SE); Oskar Drugge, Malmö (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 170 days.

(21) Appl. No.: 14/093,559

(22) Filed: Dec. 2, 2013

(65) Prior Publication Data

US 2015/0156670 A1 Jun. 4, 2015

(51) Int. Cl.
*H04B 1/00* (2006.01)
*H04W 28/04* (2009.01)
*H04L 25/02* (2006.01)

(52) U.S. Cl.
CPC ............ *H04W 28/048* (2013.01); *H04L 25/021* (2013.01); *H04L 25/0226* (2013.01); *H04L 25/0236* (2013.01)

(58) Field of Classification Search
USPC .......... 455/444, 449, 501, 67.11, 67.13, 63.1, 455/296, 303; 375/148, 232, 346
See application file for complete search history.

(56) References Cited

U.S. PATENT DOCUMENTS

| 8,781,011 B2 * | 7/2014 | Grant .......................... 375/267 |
| 2005/0201447 A1 | 9/2005 | Cairns et al. |
| 2009/0213909 A1 * | 8/2009 | Grant et al. .................... 375/148 |
| 2009/0213944 A1 * | 8/2009 | Grant ............................ 375/260 |
| 2010/0260237 A1 * | 10/2010 | Jonsson ........................ 375/148 |

FOREIGN PATENT DOCUMENTS

| WO | 2005096517 A1 | 10/2005 |
| WO | 2011022404 A2 | 2/2011 |
| WO | 2013050985 A2 | 4/2013 |

OTHER PUBLICATIONS

Author Unknown, "HARQ-ACK treatment for undetected TB for PUCCH format 3," LG Electronics; 3GPP TSG RAN WG1 #65; R1-111693; May 9-13, 2011. pp. 1-2. Barcelona, Spain.

* cited by examiner

*Primary Examiner* — Fayyaz Alam
(74) *Attorney, Agent, or Firm* — Murphy, Bilak & Homiller, PLLC

(57) ABSTRACT

In one aspect of the teachings herein, a receiver generates an improved estimate of other-cell covariance for the data region of its own-cell signal, by supplementing its pilot-based estimations of the other-cell covariance with supplemental estimations of other-cell covariance that are determined from control symbols transmitted in the control region its own-cell signal and in one or more selected other-cell signals. While the supplemental estimations are derived from the control region, the receiver advantageously fits them against the pilot-based estimations or against received-signal correlations for the data region, and uses the fitted estimations to obtain an improved estimate of other-cell covariance, for use in generating combining weights for equalization processing of the own-cell signal.

24 Claims, 7 Drawing Sheets

METHOD AND APPARATUS FOR EQUALIZATION PROCESSING IN A WIRELESS COMMUNICATION RECEIVER

TECHNICAL FIELD

The present invention generally relates to cellular communication networks and particularly relates to equalization processing in a wireless communication apparatus configured for operation in such networks.

BACKGROUND

Various receiver types use so-called "combining weights" for received signal processing, including data symbol demodulation and/or signal quality estimation. For example, linear receivers find widespread use in wireless communication networks, e.g., as implemented by wireless devices or other apparatuses that are configured for operation in such networks.

A linear receiver that implements minimum-mean-square-error, MMSE, processing operates as a combiner, according to a set or vector of combining weights W. The combining weights W are determined so as to minimize the error between symbol values as detected from the received signal r and the corresponding actual transmitted symbol values. See WO 2013/050985 A2, as published on 11 Apr. 2013, for example details regarding MMSE operation.

As is well understood by those of ordinary skill in the art, these combining weights may be calculated as $W=R^{-1}H$, where H denotes a vector or set of the relevant propagation channel estimates and where R denotes a covariance matrix characterizing the noise and/or interference in the desired signal. The covariance is determined as between received signal streams corresponding to different path delays and/or different receiver antennas.

The matrix R is referred to herein as the "overall covariance matrix" and it may be defined as $R=E\{rr^H\}$, where "E" denotes expected value. In general, any "covariance matrix" referred to in this disclosure shall be understood as characterizing noise and/or interference, unless otherwise noted.

An apparatus operating in a cellular communication network generally receives an own-cell signal from a serving cell and one or more other-cell signals from other cells, e.g., from neighboring cells that are within radio range of the apparatus. Correspondingly, the overall covariance matrix R represents a combination of covariance characterizing noise and/or interference associated with own-cell transmissions and with other-cell transmissions. The own-cell covariance term in R characterizes noise and/or interference arising from multi-stream MIMO transmissions in the serving cell. The other-cell covariance term in R characterizes noise and/or interference from one or more other-cell transmissions that are received by the apparatus as interfering transmissions. The other-cell covariance term may be denoted by the covariance matrix $R_{other}$.

In a Long Term Evolution, LTE, example, an apparatus operating in an LTE network receives a composite signal that includes an own-cell signal from its serving cell and other-cell signals transmitted in other cells that are nearby. According to the LTE specifications, these signals are synchronized and include defined control and data regions. The own-cell signal includes Cell-specific Reference Symbols or CRS that are specific to that cell but not specific to any particular apparatus operating in the cell. The CRS are distributed across the control and data regions of the own-cell signal and they serve as common pilot symbols for all apparatuses operating in the cell. A data transmission within the data region of the own-cell signal also may include Demodulation Reference Symbols or DMRS, which are precoded for the apparatus targeted by that data transmission. The DMRS thus serve as a type of dedicated pilot that provides for enhanced channel estimation with respect to the data transmission.

These common and dedicated pilot symbols are used by the apparatus to estimate the own-cell channel H. By convention, they are further used to estimate the overall and other-cell covariance matrices R and $R_{other}$. Other-cell covariance may be particularly significant in certain transmission environments, such as in a heterogeneous network that comprises a mix of macro and pico cells. As suggested by the terminology, the pico cells provide service over limited geographic areas or zones in comparison to the macro cells. Correspondingly, the pico cells are provided by base stations or other radio nodes that are typically much lower in power than the radio node(s) providing the macro cells. Consequently, an apparatus operating near the edge of a pico cell edge may suffer significant levels of other-cell interference from one or more neighboring macro cells.

Accurate estimation of the other-cell covariance $R_{other}$ is critical for accurate estimation of the overall covariance matrix R, which in turn is critical for accurate determination of the combining weights W. It is recognized herein that the relatively small number of pilot symbols available in the own-cell signal for estimation of $R_{other}$ reduces the quality of covariance estimation. That reduction in quality causes receiver performance to suffer, which in turn reduces data throughput to such receivers and thus lowers overall network throughput and efficiency.

SUMMARY

In one aspect of the teachings herein, a receiver generates an improved estimate of other-cell covariance for the data region of its own-cell signal, by supplementing its pilot-based estimations of the other-cell covariance with supplemental estimations of other-cell covariance that are determined from control symbols transmitted in the control region of its own-cell signal and in one or more selected other-cell signals. While the supplemental estimations are derived from the control region, the receiver advantageously fits them against the pilot-based estimations or against received-signal correlations for the data region, and uses the fitted estimations to obtain an improved estimate of other-cell covariance, for use in generating combining weights for equalization processing of the own-cell signal.

In one embodiment, a wireless communication apparatus is configured for operation in a cellular communication network and it includes a communication transceiver that is operatively associated with two or more receiver antennas and configured to receive a composite signal that includes synchronized own-cell and other-cell signals having a control region and a data region. The apparatus further includes a processing circuit that is operatively associated with the communication transceiver.

The processing circuit is configured to generate a first covariance matrix from pilot symbols in the own-cell signal, characterizing noise and/or interference from the other-cell signals. The processing circuit is further configured to obtain pseudo-pilot symbols from control symbols conveyed in the control region of the own-cell signal and one or more selected ones of the other-cell signals, and to generate a set of supplemental covariance matrices from the pseudo-pilot symbols.

Each supplemental covariance matrix characterizes noise and/or interference from the other-cell signals according to a corresponding interference hypothesis regarding whether individual ones of the selected other-cell signals are assumed to be an interferer or a non-interferer with respect to the data region of the own-cell signal. Correspondingly, the processing circuit is configured to determine a set of fitting weights that best fit a linear combination of the set of supplemental covariance matrices to the first covariance matrix, or to a signal correlation matrix calculated from data-region samples of the received composite signal.

The processing circuit is further configured to form an overall covariance matrix as a linear combination of an estimated own-cell covariance matrix and an other-cell covariance matrix comprising a weighted linear combination of the first and supplemental covariance matrices. The weighting factors used in the weighted linear combination are determined by the processing circuit as a function of the fitting weights, and the processing circuit is further configured to calculate combining weights for the own-cell signal as a function of the overall covariance matrix, and to use the combining weights for equalizing the own-cell signal.

In another embodiment, a method of equalization processing is implemented in a wireless communication apparatus configured for operation in a cellular communication network. The method includes receiving a composite signal that includes synchronized own-cell and other-cell signals having a control region and a data region, and generating a first covariance matrix from pilot symbols in the own-cell signal. The first covariance matrix characterizes noise and/or interference from the other-cell signals. The method further includes obtaining pseudo-pilot symbols from control symbols conveyed in the control region of the own-cell signal and one or more selected ones of the other-cell signals. Correspondingly, the method includes generating a set of supplemental covariance matrices from the pseudo-pilot symbols.

Each supplemental covariance matrix characterizes noise and/or interference from the other-cell signals, according to a corresponding interference hypothesis regarding whether individual ones of the selected other-cell signals are assumed to be an interferer or a non-interferer with respect to the data region of the own-cell signal, and the method includes determining a set of fitting weights that best fit a linear combination of the set of supplemental covariance matrices to the first covariance matrix, or to a signal correlation matrix calculated from data-region samples of the received composite signal.

The method further includes forming an overall covariance matrix as a linear combination of an estimated own-cell covariance matrix and an other-cell covariance matrix comprising a weighted linear combination of the first and supplemental covariance matrices, where the weighted linear combination uses weighting factors determined as a function of the fitting weights. Correspondingly, the method includes calculating combining weights for the own-cell signal as a function of the overall covariance matrix and using the combining weights for equalizing the own-cell signal. For example, the combining weights are used for detecting data symbols transmitted in the data region of the own-cell signal and/or for estimating the signal quality of the own-cell signal.

While the above examples indicate that the set of pseudo-pilot symbols used for generation of the supplemental covariance matrices are derived from control symbols, it is also contemplated herein that, in some embodiments, the pseudo-pilot symbols are based on own-cell CRS that are overlapped by CRS transmissions in one or more other cells. In such cases, the first covariance matrix described above is based on own-cell DMRS, for example.

The CRS overlap condition may be known by, for instance, reading other-cell broadcast channels. In any case, the overlapped CRS exhibit interference and/or noise arising from the overlapping CRS transmissions in the other cell or cells, and thus can be used as pseudo-pilot symbols for generating the supplemental covariance matrices. This usage can be as an alternative to the use of control symbols described above, or in addition to use of the control symbols. That is, the pseudo-pilot symbol set used for generating the supplemental covariance matrices can be based on control symbols, overlapped CRS, or both.

With these example variations in mind, it will be understood that the embodiments herein provide more steady combining weights for own-cell signal equalization. These improved combining weights result in better throughput performance, as compared to conventional estimation of covariance based only on a smaller set of actual pilot symbols.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
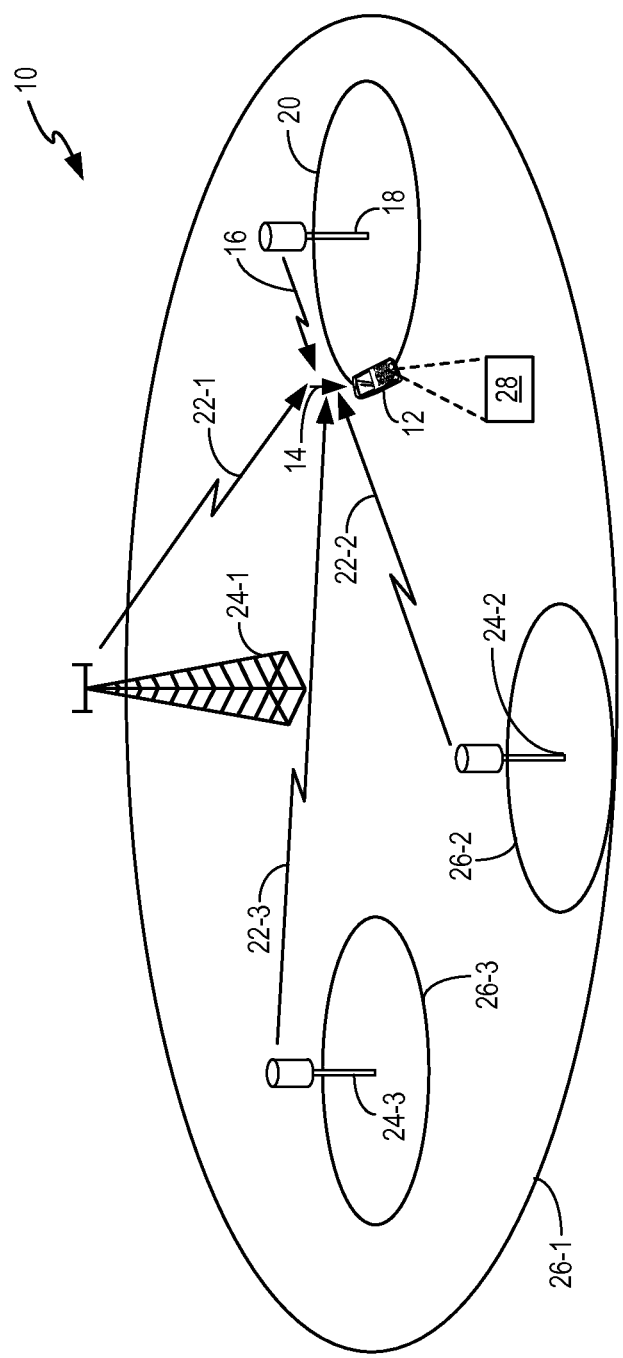
FIG. 1 is a block diagram of one embodiment a wireless communication apparatus configured according to the teachings herein for operation in a cellular communication network.

FIG. 1 partially illustrates a cellular communication network 10 that provides communication services to any number of wireless communication apparatuses 12, only one of which is shown in the diagram for ease of illustration. Using terminology adopted by the Third Generation Partnership Project, 3GPP, the apparatus 12 is a user equipment or UE. More broadly, the apparatus 12 can be understood as a smartphone, tablet, computer, network adapter, or any other wireless device or system that is configured for operation in accordance with the radio access technology or technologies and associated protocols used by the network 10.

By way of non-limiting example, the network 10 is configured as a "heterogeneous network" having a mix of radio access technologies, architectures, transmission solutions, and/or base stations of varying transmission powers corresponding to cells of varying coverage areas. The particular cell or cells used to serve the apparatus 12 depend at any given time on a variety of factors, including the capabilities of the apparatus 12 and the network 10, the location of the apparatus 12 with respect to given cells within the network 10, the communication services requested for or in use at the apparatus 12, and the quality of the wireless communication link(s) between the network 10 and the apparatus 12.

According to the illustrated example, the apparatus 12 receives a composite signal 14 that includes an own-cell signal 16 transmitted by a serving or own-cell base station 18 in a serving or own cell 20. Depending on location and channel conditions, the composite signal 14 includes one or more other-cell signals. In the example, the composite signal 14 may include contributions from any one or more of the other-cell signal 22-1 as transmitted by the other-cell base station 24-1 in the other cell 26-1, the other-cell signal 22-2 as transmitted by the other-cell base station 24-2 in the other cell 26-2, and the other-cell signal 22-3 as transmitted by the other-cell base station 24-3 in the other cell 26-3.

Unless needed for clarity, suffixes are not used and the reference number "22" may be used to refer to other-cell signals in the singular and plural senses. Likewise, the reference number "26" may be used to refer to other cells in the singular and plural senses. Further, the use of different reference numbers as between the own cell 20 and other cells 26 and their corresponding signals 16 and 22 does not necessarily mean that there is any technical or operational difference between them, except for their serving and non-serving relationships to the apparatus 12.

In that regard, the own-cell signal 16 is a desired or wanted signal from the perspective of the apparatus 12 and the other-cell signals 22 are interfering, undesired signals. Of course, the apparatus 12 may be served from multiple cells—i.e., there may be more than one own-cell signal 16. Further, the other-cell signals 22 generally are not received with the same signal strength at the apparatus 12 and at any given time one, two, or a small handful of other-cell signals 22 may be dominant interferers at the apparatus 12. The number and mix of other-cell signals 22 interfering with reception of the own-cell signal 16 changes dynamically, as function of network activity, the number of other apparatuses active in the own cell 20 and in the neighboring other cells 26, the channel conditions at issue, the mobility of the apparatus 12, etc.

The illustrated scenario shall be understood as non-limiting in a more general sense with respect to the network 10. For example, the network 10 is depicted as a heterogeneous network having a mix of cell sizes, Radio Access Technologies, and/or base station powers and configurations. The own cell 20 is a pico cell overlaid on the other cell 26-1 as a macro cell, and the other cells 26-2 and 26-3 are other pico cells overlaid on the same macro cell. The teachings herein provide significant advantages in this heterogeneous network context, such as where the other-cell signal 22-1 from the macro other cell 26-1 is the dominant source of interference in the received composite signal 14 at the apparatus 12. However, the teachings are not limited to heterogeneous networks and have direct applicability to homogeneous implementations of the network 10 having substantially identical or at least similar macro-layer base stations, each providing one or more macro cells. In such cases, the own-cell signal 16 comes from a serving macro base station and the one or more other-cell signals 22 come from one or more non-serving macro base stations.

Regardless of the particular network implementation at issue, the apparatus 12 as contemplated herein includes a covariance estimation circuit 28 that enables the apparatus 12 to improve its estimation of the other-cell covariance matrix $R_{other}$, and thereby improve its processing of the own-cell signal 16. With better, more consistent estimation of $R_{other}$, the apparatus 12 derives more accurate receiver weights W, which are used for equalization of the own-cell signal 16, e.g., for data symbol detection and/or signal quality estimation with respect to the own-cell signal 16.

Consider the case where the own-cell base station 18 and the other-cell base stations 24 all use the same radio access technology. In one example, all of the base stations 18 and 24 are configured according to the Long Term Evolution, LTE, specifications promulgated by the 3GPP. Thus, the transmission timing is synchronized across the base stations 18 and 24. Therefore, the timing of the own-cell signal 16 is synchronized with respect to the other-cell signals 22.

Figure 2:
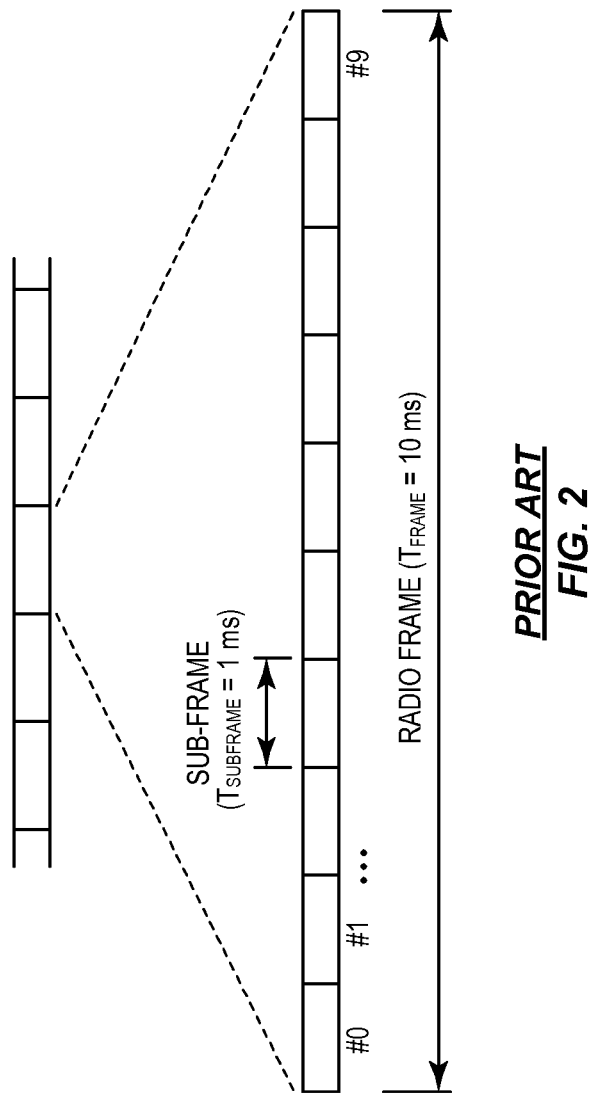
FIG. 2 is a diagram of a known frame and subframe structure for a downlink carrier signal in a Long Term Evolution, LTE, network.

Now consider FIG. 2, which illustrates a standard framing structure for the LTE downlink, wherein individual radio frames are ten milliseconds in duration, and where each frame includes ten subframes of one millisecond in duration. Each subframe spans two slots, which each slot being of 0.5 milliseconds in duration. Each slot spans seven symbol times if normal Cyclic Prefix, CP, is used, or six symbol times if extended CP is used.

Figure 3:
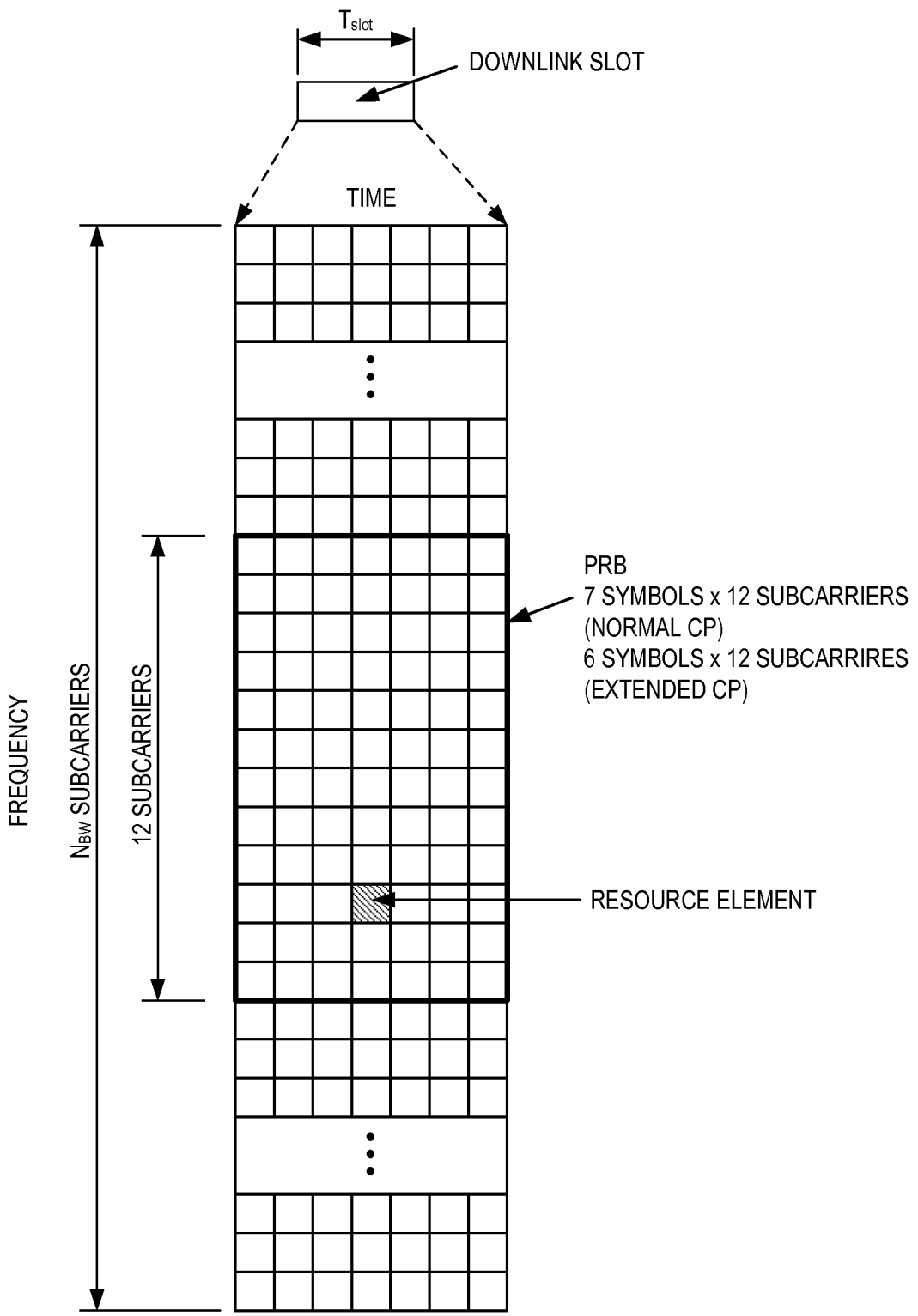
FIG. 3 is a diagram of a known physical resource block arrangement for a downlink subframe in an LTE carrier.

FIG. 3 depicts this structure and also illustrates the time-frequency resources in the Orthogonal Frequency Division Multiplex, OFDM, signal characteristic of the LTE downlink. Each base station 18 or 24 according to this example LTE context transmits a downlink carrier that comprises a number of narrowband subcarriers spaced over an overall carrier bandwidth $N_{BW}$. Within each OFDM symbol time, the individual subcarriers each provide one resource element or RE for symbol transmission.

Within each slot, the aggregation of REs over twelve subcarriers is referred to as a Physical Resource Block or PRB, and pairs of PRB are dynamically scheduled for use in targeting transmissions to individual apparatuses 12. Each subframe (which spans two consecutive slots) represents a Transmission Time Interval or TTI and PRB pairs within each TTI are allocated according to ongoing user scheduling operations. Again, while only one apparatus 12 is depicted in FIG. 1, it will be appreciated that a potentially large plurality of other apparatuses may operate within the network 10, with various ones of them being served in any one or more of the cells 20 and 26. Scheduling to these individual users is carried out on per TTI, per PRB pair basis.

Figure 4:
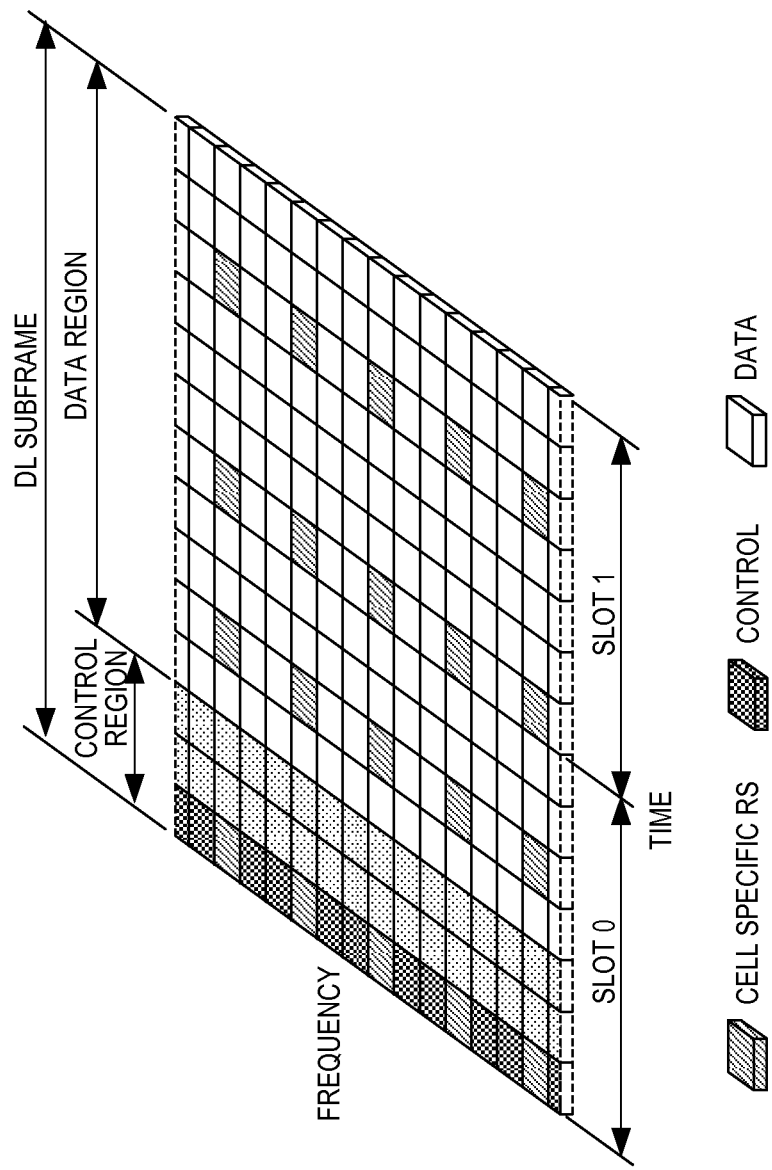
FIG. 4 is a diagram of further example details for a downlink frame.

FIG. 4 illustrates a PRB pair within a regular downlink subframe in an LTE carrier—e.g., in any one of the own-cell signal 16 or other-cell signals 22. Again, the subframe spans two slots, shown here as SLOT 0 and SLOT 1, and each PRB spans twelve subcarriers within a respective one of the slots. The first two or three symbol times within the first slot of each subframe represent a defined "control region" and are reserved for the transmission of control signaling, i.e., Physical Downlink Control Channel, PDCCH, signaling using a predefined modulation format. Resource Element Groups or REGs comprise four consecutive REs within the control region. The remainder of the subframe comprises a data region.

Note that as of Release 11 of the 3GPP specifications for LTE, the data region also may carry Enhanced PDCCH, E-PDCCH, transmissions. E-PDCCH transmissions use portions of the data region for control-type transmissions. Further, those of ordinary skill in the art will appreciate that certain types of subframes deviate from the basic structure just outlined, e.g., Multicast-broadcast single-frequency network (MBSFN) subframes. However, the illustrated arrangement of defined control and data regions generally applies for subframes in the LTE downlink.

Cell-specific Reference Symbols or CRS serve as common pilots and appear in the own-cell signal 16 according to a defined pattern that spans the control and data regions. The CRS conveyed in the own-cell signal 16 support channel estimation by the apparatus 12 with respect to the own-cell signal 16. The CRS conveyed in respective ones of the other-cell signals 22 support channel estimation by the apparatuses served in the corresponding ones of the other cells 26.

Apparatus-specific Demodulation Reference Symbols or DMRS may be sent in the data region of a PRB targeted to a given apparatus 12. The DMRS are subjected to the same precoding, etc., as the data symbols targeted to the device 12, and thus provide for improved channel estimation with respect to the data region of the own-cell signal 16 by the targeted apparatus 12. Thus, for a data transmission in the own-cell signal 16 that is targeted to the illustrated apparatus 12, the own-cell signal 16 may include DMRS targeted to the apparatus 12, among the data-region REs of the own-cell signal 16 that are used for the data transmission.

Figure 5:
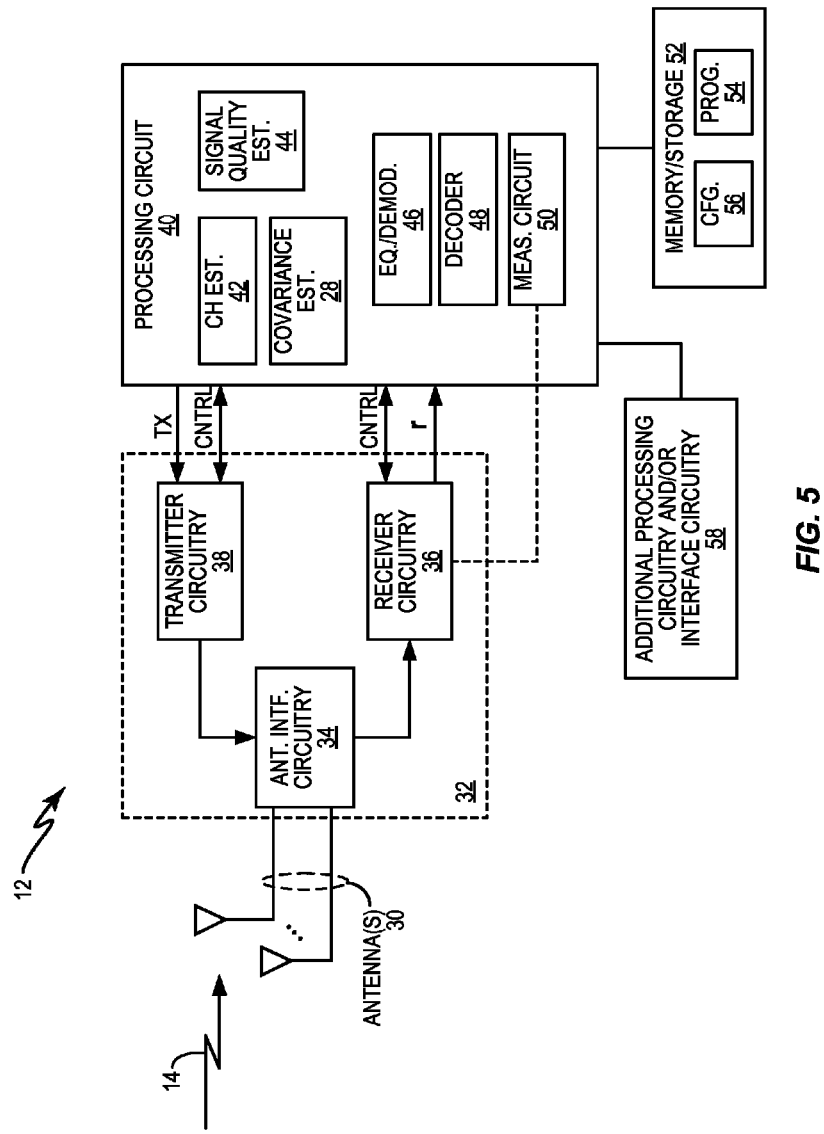
FIG. 5 is a block diagram of one embodiment of the wireless communication apparatus introduced in FIG. 1.

With the above example details in mind, FIG. 5 illustrates one embodiment of the apparatus 12, as configured for operation in the network 10 according to the teachings herein. The device 12 includes two or more receiver antennas 30, which are operatively associated with a communication transceiver 32, e.g., a radio transceiver. The communication transceiver 32 is configured to receive a composite signal 14 on its two or more antennas 30. The received composite signal 14 includes synchronized own-cell and other-cell signals 16 and 22 that have a defined control region and a defined data region.

The communication transceiver 32 includes antenna interface circuitry 34, receiver circuitry 36, and transmitter circuitry 38. The receiver circuitry 36 provides the received composite signal 14 to a processing circuit 40. Note that for convenience, the received composite signal 14 as output from the communication transceiver 32 may be denoted as the received signal r. The processing circuit 40 may perform a number of signal processing and related tasks, but of particular interest herein the processing circuit 40 is configured for processing the received signal r according to the covariance estimation taught herein and can therefore be understood as including or at least functionally implementing the aforementioned covariance estimation circuit 28.

To better understand such processing, consider that the receiver circuitry 36 in an example implementation includes parallel signal processing chains, each corresponding to a respective one of the two or more receiver antennas 30. According to such an arrangement, the composite signal 14 as received on each antenna 30 is filtered, down-converted, and digitized into a stream of digital samples. These parallel streams of digital samples correspond to the multiple antennas 30 and can be understood as representing the received composite signal 14 in digital form. For each symbol time, the received signal r is a vector of counterpart received signal sample values, as taken across the antennas 30. Each counterpart sample may be understood as representing the same resource element or RE in the received signal r, for a different one of the antennas 30.

The processing circuit 40 is operatively associated with the communication transceiver 32 and configured to process the received signal r. Processing includes, for example, demodulating the own-cell signal 16 from the received signal r and decoding the own-cell signal demodulation results, to recover data transmitted to the apparatus 12 in the own cell 18. For received signal processing, the processing circuit 40 performs frequency domain equalization on the own-cell signal 16 and to do so it needs to derive a set of combining weights W. As explained in the Background of this disclosure, these combining weights W are derived from an estimate of the overall covariance matrix R. Covariance is determined as between respective pairs of the antennas 30, using counterpart samples of the received signal r.

According to the teachings herein, the apparatus 12 is configured to enhance its estimation of the other-cell covariance matrix $R_{other}$, to obtain a more accurate overall covariance matrix R, for use in generating the combining weights W. In this respect the processing circuit 40 is configured to generate a first covariance matrix from pilot symbols in the own-cell signal 16. The first covariance matrix characterizes noise and/or interference from the other-cell signals 22, and it may be denoted as $R_{CRS}$, which indicates that it is determined using Cell-specific Reference Symbols, CRS, conveyed in the own-cell signal 16. Alternatively, the first covariance matrix is denoted as $R_{DMRS}$, to indicate that it is determined from Demodulation Reference Symbols, DMRS, conveyed in the data region of the own-cell signal 16. More particularly, the DMRS are distributed among the REs used for the data transmission targeted to the apparatus 12 in the own-cell signal 16. In some embodiments, the first covariance matrix is formed as the sum or linear combination of $R_{CRS}$ and $R_{DMRS}$.

Such processing can be understood as the processing circuit 40 as generating a pilot-based estimate of other-cell covariance—i.e., using actual pilot symbols, CRS and/or DMRS, as conveyed in the own-cell signal 16. As taught herein, the processing circuit 40 advantageously obtains additional or supplemental estimates of other-cell covariance. For example, in some embodiments, the processing circuit 40 is further configured to obtain pseudo-pilot symbols from control symbols conveyed in the control region of the own-cell signal 16 and one or more selected ones of the other-cell signals 22, and to use these pseudo-pilot symbols to generate supplemental estimates of other-cell covariance, which are then fitted or otherwise compensated in dependence on how well they characterize noise and/or interference seen in the data-region REs used for an own-cell data transmission to the apparatus 12. That determination can be made using covariance estimates obtained from the data-region DMRS targeted to the apparatus 12 and/or by correlating data-region samples of the received composite signal 14 across the antennas 30.

An example of pseudo-pilot processing is further detailed later herein, but it will be appreciated that the term "pseudo-pilot" is used because the apparatus 12 does not know in advance the value of these control symbols or even whether given ones of the control symbols are actually transmitted. However, the apparatus 12 does know the predefined or default control-region locations and the modulation formats used for control symbol transmissions and can therefore detect the presence and value of transmitted control symbols with sufficiently good reliability for treating the detected control-symbol values as if they were additional pilots.

In other words, the processing circuit 40 can be understood as gaining a larger set of samples from which to estimate the other-cell covariance, based on obtaining the so-called pseudo-pilot symbols from the control region of the own-cell signal 16 and the selected one or ones of the other-cell signals 22. Here, the one or more "selected" other-cell signals 22 can be all other-cell signals 22 perceived by the apparatus 12. More practically, the one or more "selected" other-cell signals 22 include a most-dominant one or ones of the other-cell signals 22. The processing circuit 40 may be configured to perform the selection, e.g., based on signal strength measurements, or the network 10 may indicate the selection to the apparatus 12.

In any case, for any given number of interfering other-cell signals 22, the processing circuit 40 is configured to select one or more of them for explicit consideration in the equalization processing taught herein. A selected other-cell signal 22 is one for which the processing circuit 40 obtains pseudo-pilot symbols or, in some embodiments, uses "overlapped"

CRS, and performs supplemental covariance matrix generation. That is, the processing circuit 40 in one or more embodiments is configured generate a set of supplemental covariance matrices from the pseudo-pilot symbols, or from overlapped CRS. An overlapped CRS means that one or more other-cell signals 22 include a CRS transmitted on the same RE as is being used for a CRS in the own-cell signal 16.

Each supplemental covariance matrix characterizes noise and/or interference from the other-cell signals 22 according to a corresponding interference hypothesis regarding whether individual ones of the one or more selected other-cell signals 22 are assumed to be an interferer or a non-interferer with respect to the data region of the own-cell signal 16. Correspondingly, the processing circuit 40 is configured to determine a set of "fitting weights" $w_m$ that best fit a linear combination of the set of supplemental covariance matrices to the first covariance matrix, or to a signal correlation matrix calculated from data-region samples of the received composite-signal 14.

The processing circuit 40 is configured to form the overall covariance matrix R as a linear combination the first and supplemental covariance matrices. The linear combination uses "weighting factors", e.g., numeric scaling factors denoted as a, b, c, etc., which are determined as a function of the fitting weights $w_m$. In turn, the processing circuit 40 is configured to calculate combining weights $W_{(k,l)}$ as a function of the overall covariance matrix R, and to use the combining weights $W_{(k,l)}$ for equalizing the own-cell signal 16. Examples of equalization processing include estimating an own-cell signal quality and/or demodulating data symbols from the data region of the own-cell signal 16.

Specifically, as part of the demodulation process the combining weights $W_{(k,l)}$ are multiplied with the vector of received signals from each antenna 30, to form a vector of decision variables $\hat{d}(k,l)$. Each element in $\hat{d}(k,l)$ corresponds to a specific spatial multiplexing stream and the decision variables contained in $\hat{d}(k,l)$ are then further processed to generate soft-bit input to the decoder portion of the processing circuit 40.

The processing circuit 40 comprises fixed circuitry, programmed circuitry, or some combination of both. The processing circuit 40 in an example embodiment includes a number of physical or at least functional processing circuits, which may be referred to as processing "units" or "modules" but which should be understood as circuitry specially adapted to perform the covariance estimation algorithm set forth herein, or variations of that algorithm.

In the embodiment of FIG. 5, the processing circuit 40 includes a channel estimation circuit 42, which is configured to perform channel estimation with respect to the own-cell signal 16 and may be configured to perform channel estimation with respect to the other-cell signals 22 selected for use in supplemental covariance matrix estimation as taught herein. The example processing circuit 40 further includes a signal quality estimation circuit 44, an equalization and demodulation circuit 46, a decoder circuit 48, and a measurement circuit 50.

The processing circuit 40 further includes or is associated with memory/storage 52, which may be used to store a computer program 54 and/or configuration data 56. Such data is persistently stored, although it may be updated, and the memory/storage 52 further includes dynamic or working memory for supporting run-time processing operations of the processing circuit 40, or such working memory is otherwise integrated within the processing circuit 40. Still further, depending on its intended use and implemented features, the apparatus 12 includes additional processing circuitry and/or interface circuitry 58. Such circuitry comprises, for example, one or more application processors, which run software or firmware applications that send and/or receive information via the processing circuit 40 and the communication transceiver 32.

In some embodiments, the processing circuit 40, including the covariance estimation circuit 28, comprises one or more microprocessors, digital signal processors, ASICs, FPGAs, and/or other digital processing circuitry. In turn, the digital processing circuitry comprising the processing circuit 40 is configured to perform the covariance estimation algorithm taught herein based on its execution of computer program instructions comprising the computer program 54, as stored in a computer-readable medium in or accessible to the processing circuit 40, as stored in the memory/storage 52. As previously suggested, the memory/storage 52 comprises, for example, both volatile storage for working data, and non-volatile storage for the computer program 54, and for any supporting configuration data 56. Non-limiting memory/storage examples include EEPROM and FLASH storage devices.

Regardless of how the processing circuit 40 is implemented, in at least one embodiment, the covariance estimation circuit 28 is configured to estimate the first covariance matrix and the supplemental covariance matrices as described above, and the equalization and demodulation circuit 46 is configured to obtain the pseudo-pilot symbols for such estimation and to determine the set of fitting weights, form the overall covariance matrix, calculate the combining weights, and use the combining weights for equalization processing of the own-cell signal 16.

Figure 6:
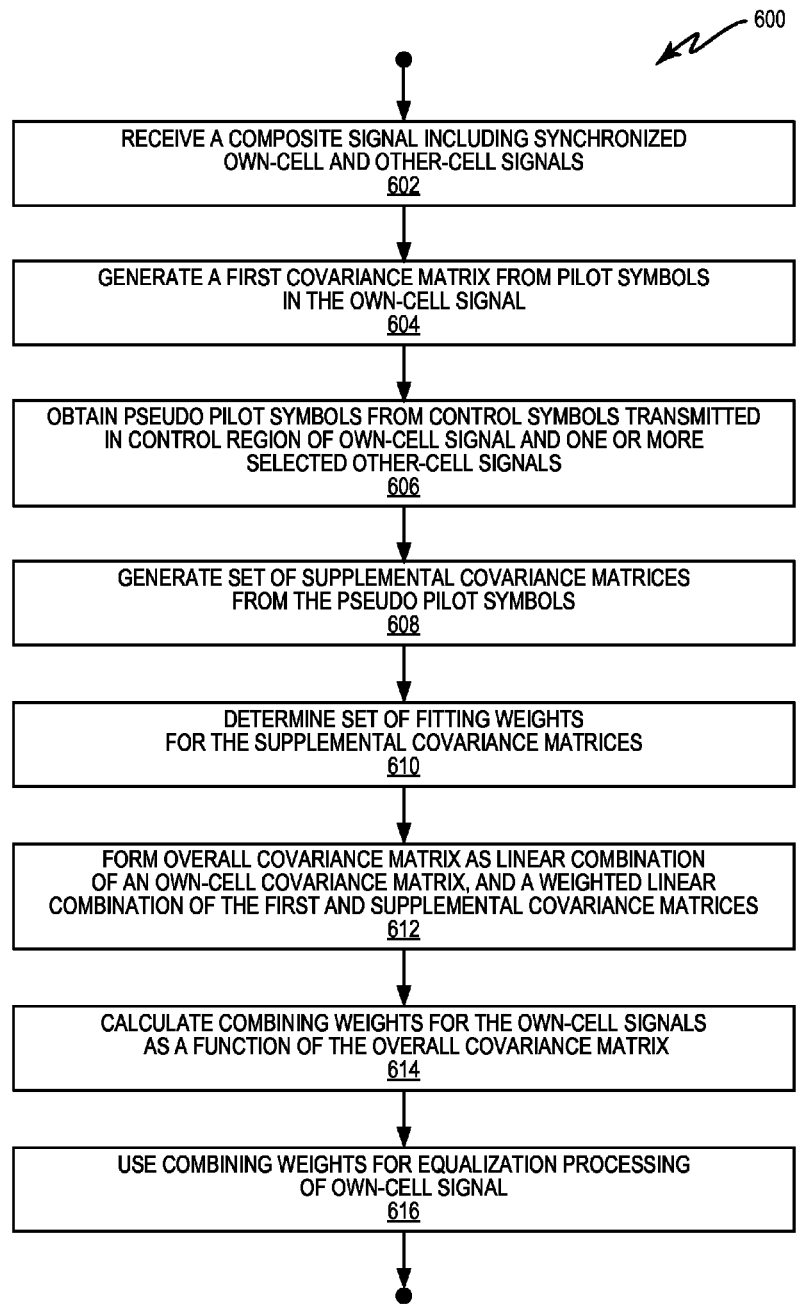
FIG. 6 is a logic flow diagram of one embodiment of a method of equalization processing as contemplated herein, and as may be implemented by the wireless communication apparatus of FIG. 5, for example.

FIG. 6 illustrates a method 600 of equalization processing as may be implemented by the apparatus 12. The method 600 includes receiving (Block 602) a composite signal 14 that includes synchronized own-cell and other-cell signals 16, 22 having a control region and a data region, and includes generating (Block 604) a first covariance matrix from pilot symbols in the own-cell signal 16, characterizing noise and/or interference from the other-cell signals 22. The method 600 further includes obtaining (Block 606) pseudo-pilot symbols from control symbols conveyed in the control region of the own-cell signal 16 and one or more selected ones of the other-cell signals 22, and generating (Block 608) a set of supplemental covariance matrices from the pseudo-pilot symbols.

Each supplemental covariance matrix characterizes noise and/or interference from the other-cell signals 22 according to a corresponding interference hypothesis regarding whether individual ones of the one or more selected other-cell signals 22 are assumed to be an interferer or a non-interferer with respect to the data region of the own-cell signal 16. Correspondingly, the method 600 includes determining (Block 610) a set of fitting weights $w_m$ that best fit a linear combination of the set of supplemental covariance matrices to the first covariance matrix or to a signal correlation matrix calculated from data-region samples of the received composite signal 14, and forming (Block 612) an overall covariance matrix R as a linear combination of an estimated own-cell covariance matrix and an other-cell covariance matrix, $R_{other}$. The other-cell covariance matrix $R_{other}$ as formed in the method 600 advantageously comprises a weighted linear combination of the first and supplemental covariance matrices that uses weighting factors, e.g., weighting factors a, b, c, . . . , that are determined as a function of the fitting weights $w_m$. The method 600 further includes calculating (Block 614) combining weights W for the own-cell signal 16 as a function of the overall covariance matrix R, and using (Block 616) the combining weights W for equalizing the own-cell signal 16.

In an example implementation, the method 600 includes selecting the one or more "selected" other-cell signals 22 as the strongest one among any given number of other-cell signals 22 in the received composite signal 14. Of course, more than one other-cell signal 22 may be selected. That is, while there may be a larger number of other-cell cell signals 22 that are interfering with respect to the own-cell signal 16, the method 600 may include selecting only the strongest one for consideration in generating the set of supplemental covariance matrices, or only the strongest M ones, where M is an integer, e.g., two or three. The measuring circuit 50 shown in FIG. 5 may be used to determine received signal strength or power, or some other metric that may be used to rank the other-cell signals 22 for autonomous selection processing by the apparatus 12. In some embodiments, the network 10 may assist in identifying which other-cell signals 22 to select, or may send an indication of the selection to the apparatus 12.

It will be appreciated that in at least some embodiments, there are as many interference hypotheses and, consequently, as many supplemental covariance matrices, as there are unique combinations of interferer and non-interferer assumptions for the one or more selected other-cell signals 22. For example, with n other-cell signals 22 selected for use in obtaining supplemental covariance matrices, there will be $2^n$ supplemental covariance matrices, based on the possible combinations of binary assumptions made for each such other-cell signal 22—i.e., a first assumption that the other-cell signal 22 will be an interferer with respect to the data region of the own-cell signal 16, and a second assumption that it will be a non-interferer with respect to the data region of the own-cell signal 16.

These hypotheses reflect the fact that, at least for embodiments where the pseudo-pilot symbols are used in their generation, the supplemental covariance matrices are generated from control-region samples and not from data-region samples and control-region covariance may or may not match data-region covariance. That is, because the data-region noise and/or interference may be different than control-region noise and/or interference, a covariance that characterizes the noise and/or interference of the control region may or may not represent a good characterization of the noise and/or interference of the data region.

For example, a given other-cell signal 22 may have interfering control-region transmissions but may not have any interfering data region transmissions. In that case, the aforementioned fitting process would tend to deemphasize the particular supplemental covariance matrix or matrices generated on the assumption that this given other-cell signal 22 is an interferer with respect to the data region of the own-cell signal 16, and would tend to emphasize the supplemental covariance matrix or matrices generated on the assumption that this given other-cell signal 22 is a non-interferer with respect to the data region of the own-cell signal 16.

In more detail, in an example implementation, estimating (Block 608) the set of supplemental covariance matrices comprises, for each supplemental covariance matrix, estimating signal contributions arising from the pseudo-pilot symbols of each selected other-cell signal 22 that is assumed to be a non-interferer in the corresponding interference hypothesis, and removing those signal contributions from corresponding samples of the received signal, to obtain interference-suppressed samples, and computing the supplemental covariance matrix from the interference-suppressed samples. In one or more embodiments, such processing includes generating channel estimates—e.g., via the channel estimation circuit 42—relating each receiver antenna 30 to each selected other-cell signal 22. Thus, the estimation of the signal contributions arising from the pseudo-pilot symbols of each selected other-cell signal 22 that is assumed to be a non-interferer in the corresponding interference hypothesis comprises applying the corresponding channel estimates to the pseudo-pilot symbols.

As for fitting the supplemental covariance matrices, in one embodiment determining (Block 610) the set of fitting weights $w_m$ comprises solving for the fitting weights in a least-squares fitting processing. For example, the first covariance matrix and each supplemental covariance matrix each have a corresponding fitting weight and thus are weighted terms. The individual fitting weights are adjusted to minimize the difference between a signal correlation matrix $R_{corr}$ and the sum of the weighted terms. The signal correlation matrix $R_{corr}$ is determined, for example, from received signal samples corresponding to the data region. That is, counterpart samples—same sample time(s) taken across the antennas 30—from the data region of the received composite signal 14 are correlated to obtain a direct estimation of received signal correlation or covariance for the data region.

As noted, the first covariance matrix may comprise both a CRS-based matrix and a DMRS-based matrix, with each being a weighted term in the fitting process, along with the weighted supplemental covariance matrices. More generally, the first covariance matrix in one or more embodiments comprises one or both of a covariance matrix $R_{CRS}$ determined as a function of CRS transmitted in the own cell 20, which are not targeted specifically to the apparatus 12 via pre-coding, and a covariance matrix $R_{DMRS}$ determined as a function of DMRS in the own cell 20, which are specifically targeted to the apparatus 12 via pre-coding.

In an alternative approach, fitting is not performed with respect to the signal correlation matrix $R_{corr}$. Instead, each supplemental covariance matrix is a weighted term having a corresponding fitting weight, and the fitting weights $w_m$ are adjusted to minimize the difference between the first covariance matrix and the sum of the weighted terms. Thus, instead of the signal correlation matrix $R_{corr}$ being used as the reference for the fitting process, the first covariance matrix, as generated from actual pilot symbols conveyed in the own-cell signal 16 rather than pseudo-pilot symbols, is used as the fitting reference. For example, the first covariance matrix here is $R_{DMRS}$, and it is used as the reference for fitting the supplemental covariance matrices.

In yet another alternative to the fitting processing, least-squares-fitting is not used. Instead, each fitting weight is permitted to take on only the binary values 0 or 1. In turn, the fitting process tests for all combinations of weight values 0 or 1 and selects the combination having the smallest metric, such as the matrix Frobenius or L2 norm. The sum of these binary-valued weights would be normalized to one before being tested in the metric. Use of the binary-constrained fitting weights in this manner lowers complexity and may provide a more robust fitting process in some instances.

The fitting weights $w_m$ as determined according to any of the above approaches are scaled to sum to unity in one or more embodiments, and the overall covariance matrix R is formed as a linear combination of an estimated own-cell covariance matrix and a weighted linear combination of the first and supplemental covariance matrices that uses weighting factors, e.g., denoted as a, b, c, etc., where these weighting factors are determined as a function of the fitting weights $w_m$. Here, the weighted linear combination of the first and supplemental matrices can be understood as an improved representation of the other-cell covariance matrix $R_{other}$. The representation of $R_{other}$ is "improved" in the sense that it based on more samples than would be available in conventional approaches that use only actual pilot symbols, and yet the expansion of the sample space is compensated, i.e., by the fitting process, for the fact that the expansion uses control region samples rather than data region samples.

Broadly, then, the apparatus 12 as taught herein includes a receiver that generates an improved estimate of other-cell covariance $R_{other}$ for the data region of its own-cell signal 16, by supplementing its pilot-based estimations of the other-cell covariance with supplemental estimations of other-cell covariance that are determined from control symbols transmitted in the control region its own-cell signal 16 and in one or more selected other-cell signals 22. While the supplemental estimations are derived from the control region, the receiver advantageously fits them against the pilot-based estimations or against received-signal correlations for the data region, and uses the fitted estimations to obtain an improved estimate of other-cell covariance $R_{other}$, for use in generating combining weights W for equalization processing of the own-cell signal.

In an example of such processing, the received signal r represents a physical resource block pair, with each physical resource block comprising a plurality of resource elements. The weighting factors a, b, c, etc., are determined as a function of the fitting weights $w_m$, by scaling each fitting weight as a function of the total number of the resource elements within the physical resource block pair that are associated with the supplemental covariance matrix corresponding to the fitting weight. The weighting factors also may be determined as a function of the fitting weights, by scaling the fitting weights as a function of signal quality estimated for the one or more selected other-cell signals.

In presenting detailed mathematical examples associated with implementation of the above equalization processing, including the advantageous use of supplemental covariance matrices for improved characterization of other-cell noise and/or interference, let the received signal at issue be represented as the vector r for the k-th OFDM subcarrier and the l-th OFDM symbol. The received signal vector r has dimension $N_{Rx}$, which denotes the number of receiver antennas 30.

The received signal vector r can be expressed as a sum of the own-cell signal 16 and all interfering other-cell signals 22, along with white noise. The own-cell signal 16 is represented as $H_1(k,l)d_1(k,l)$, while each j-th other-cell signal 22 is represented as $H_j(k,l)d_j(k,l)(j>1)$ and the white noise is represented as $n(k,l)$. As such, $$r(k,l) = H_1(k,l)Pr_1 d_1(k,l) + \sum_{j=2}^{N_{Cell}} H_j(k,l)Pr_j d_j(k,l) + n(k,l) \quad (1)$$

where $d_j(k,l)$ represents the $N_{Stream} \times 1$ transmitted symbol vector to be demodulated, $Pr_j$ represents the $N_{Tx} \times N_{Stream}$ size precoder applied from the j-th other cell 26 and $H_j(k,l)$, $j=\{1, \ldots, N_{Cell}\}$ represents the $N_{Rx} \times N_{Tx}$ channel matrix between the j-th other cell 26 and the apparatus 12. Row i of the propagation channel matrix $H_j(k,l)$, $j=\{1, \ldots, N_{cell}\}$ contains the contribution to the i-th receive antenna 30. Again, $N_{Rx}$ denotes the number of receive antennas 30, while $N_{Tx}$ denotes the number of transmit antennas used for transmission of the own-cell signal 16, $N_{cell}$ denotes the number of interfering cells that are modelled, and $N_{Stream}$ denotes the number of own-cell MIMO streams.

The recovered $N_{Stream} \times 1$ signal vector at the apparatus 12 is $\hat{d}_1(k,l)$, and is detected by using a receiver weight matrix $W_1(k,l)$. Here, $W_1(k,l)$ represents a specific example of the aforementioned "combining weights" W, and they are computed as a function of the overall covariance matrix described above and denoted in the following explanation as R.

In more detail, the combining weights are denoted by the matrix $W_1(k,l)$, which has dimension $N_{Stream} \times N_{Rx}$ and can be expressed as $$\hat{d}_1(k,l) = W_1(k,l)r(k,l) \quad (2)$$

As a general proposition, for Minimum Mean Square Error, MMSE, receivers, the combining weights as used for demodulating the own-cell transmitted symbols is given by $$W_1(k,l) = (R^{-1}\hat{H}_1(k,l)Pr_1)^H \quad (3)$$

Here, $$R = (\hat{H}_1(k,l)Pr_1)(\hat{H}_1(k,l)Pr_1)^H + R_{other} \quad (4)$$

where $\hat{H}_1$ denotes the estimated channel matrix for the own cell 20 and where $R_{other}$ denotes the other-cell covariance matrix, characterizing noise and/or interference from all other-cell signals 22 in the received composite signal 14. The overall covariance matrix R therefore can be understood as including an own-cell component or term given as $(\hat{H}_1(k,l)Pr_1)(\hat{H}_1(k,l)Pr_1)^H$ and an other-cell component or term given as $R_{other}$.

In a conventional approach where CRS alone is used to determine the $R_{other}$ term in the overall covariance matrix R, the following equations may be used:

$$R(k,l) = (\hat{H}_1(k,l)Pr_1)(\hat{H}_1(k,l)Pr_1)^H + \underbrace{\frac{1}{N_{sp}} \sum_{\tilde{k},\tilde{l} \in CRS} \tilde{r}(\tilde{k},\tilde{l})\tilde{r}(\tilde{k},\tilde{l})^H}_{R_{CRS}} \quad (5)$$

$$\tilde{r}(k,l) = r(k,l) - \hat{h}(k,l)d_1(k,l) \quad (6)$$

Here, the subscript index value of "1" denotes own-cell values and $Pr_1$ is the precoder applied by the serving or own cell 20 to the data transmission in the data region of the own-cell signal 16, which is targeted to the apparatus 12, $\tilde{k},\tilde{l} \in CRS$ refers to the set of REs in the own-cell signal 16 that contain CRS symbols, $N_{sp}$ is the number of REs, or pilot symbols used in the averaging of the other-cell covariance matrix, elements, $\hat{H}_1(k,l)$ is the estimated channel matrix for the own cell 20, $d_1(k,l)$ are the known values of the CRS pilot symbols, and $\hat{h}(k,l)$ is the $N_{Rx} \times 1$ channel estimate vector for a particular CRS RE.

In a conventional approach that does not benefit from the supplemental covariance matrices taught herein, the $R_{CRS}$ matrix, as determined from the CRS, may be used as the other-cell covariance $R_{other}$. According to that conventional approach, in equation (6), the own-cell signal 16 is subtracted from the composite or overall received signal, and correlation is performed using the resulting modified received signal, as seen in equation (5). In other words, the own-cell signal contributions are removed from the received signal r in equation (6) and the resulting modified received signal $\tilde{r}$ is then used in equation (5) to determine the $R_{other}$ term in the overall covariance matrix R.

Theoretically, the receiver in question could have correlated the received signal r(k,l) without subtracting the own-cell signal 16, but in practice this approach usually leads to an overall covariance matrix R(k,l) of inferior quality. Note, too, that the first term in equations (4) and (5) models the inter-stream interference, i.e., the own-cell covariance term, which is present when MIMO is activated in the own cell 20.

While the above equations (1)-(6) and the associated processing are well understood in the arts, an apparatus 12 according to the teachings herein identifies additional REs within the received signal r, and uses them to supplement the limited set of CRS/DMRS samples that would otherwise be used without supplementation to estimate the other-cell covariance matrix $R_{other}$. In one such approach, estimation of the other-cell covariance matrix $R_{other}$ is supplemented using resource elements or REs that are used for transmitting control signals—that is, the apparatus 12 advantageously detects control symbols transmitted in the control region of the own-cell signal 16 and one or more selected ones of the interfering other-cell signals 22 to increase the number of samples from which the other-cell covariance is estimated.

Let these control-region resource-element groups or REGs be defined as $REG_m$, where m indexes the number for a particular REG. Each REG contains four symbols, which are known to the apparatus 12 to be modulated using either Quadrature Phase Shift Keying, QPSK, or Binary Phase Shift Keying, BPSK. The control symbols within one REG can be assumed to be transmitted with equal power. Of course, it may be that one or several REGs are unused. For these REGs, the transmitted symbol power is zero.

The apparatus 12, and specifically the processing circuit 40 with its included covariance estimation circuit 28, is advantageously configured to use these control transmissions within the control region to obtain what are referred to herein as pseudo-pilot symbols for use in generating the set of supplemental covariance matrices described at length above. Assuming the system model from equation (1), the apparatus 12 starts by estimating the transmitted control-symbol-layer vector $d_j(k,l)$ for the own-cell signal 16 (j=1) and a selected set of the other-cells signals 22 (j>1). The set size of the selected other-cell signals 22 one or greater, and the set may be selected based on which other-cell signals 22 are received with substantial signal strength at the apparatus 12—e.g., those other-cell signals 22 in the received composite signal 14 that are at or above a defined signal strength threshold. Many methods exists to identify the strong interfering cells, for example, the measuring circuit 50 of the apparatus 12 may perform Reference Signal Received Power, RSRP, measurements and use those measurements as an indication of other-cell signal strength. The selection of which other-cell signals 22 to consider may also be determined by the network 10, e.g., based on measurement reports sent from the apparatus 12 to the own-cell base station 18.

The demodulation of the $d_j(k,l)$ vector can be done using combining weights based on CRS in the own-cell signal 16, as determined using a conventional maximum ratio or MMSE method. The estimate of $d_j(k,l)$ can be made after decoding the demodulation results in the processing circuit 40, or by making hard decisions on $d_j(k,l)$ prior to soft-bit value generation. The estimated pseudo-pilot symbol vectors may be denoted as $\tilde{d}_j(k,l)$. The apparatus 12 then estimates channel samples per cell j for the control region by de-rotating the received signal r using the phase of the pseudo-pilot symbols, that is, $$\tilde{h}_{j,CCH}(k,l) = r(k,l)(Pr_j(k,l)\tilde{d}_j(k,l))^* \tag{7}$$

Here and below $Pr_j(k,l)$ denotes a precoding matrix that may be applied to the transmitted control symbols and the CCH subscript denotes "control channel" as transmitted in the control region. The apparatus 12 then calculates channel estimates by averaging channel samples over a REG, because it cannot assume the transmitted power to be equal across several REGs. The use of CRS symbols for channel estimation is not recommended in this context, because the power of CRS and the control channel may not be the same.

In particular, the apparatus 12 may be configured to average over the four symbols contained in each REG to obtain an intermediate control-channel based channel estimate as $$\overline{h}_{j,CCH}(m) = \frac{1}{4} \sum_{k,l \in REG_m} \tilde{h}_{j,CCH}(k,l) \tag{8}$$

Now, it may be that a certain REG is not transmitted in the control region for cell j, and the apparatus 12 is therefore configured to make a comparison between the CRS signal-to-interference ratio, SIR, and the SIR as determined from $\overline{h}_{j,CCH}(m)$. If the SIR estimated using the four symbols contained in a given REG is larger than a given threshold, the apparatus 12 may logically conclude that the REG contains a control transmission. Otherwise, the apparatus 12 assumes that no control transmission was made in the given REG, meaning that it should not be used to obtain pseudo-pilot symbols. Mathematically, this can be formulated as $$SIR_{j,CCH}(m) = \frac{\overline{h}_{j,CCH}^H(m)\overline{h}_{j,CCH}(m)}{I_{j,CRS}(m)} \tag{9}$$

$$\hat{h}_{j,CCH}(m) = \begin{cases} 0, & \text{if } \tau_{unused}SIR_{j,CCH}(m) < SIR_{j,CRS}(m) \\ \overline{h}_{j,CCH}(m), & \text{else} \end{cases}$$

Here $I_{j,CRS}(m)$ and $SIR_{j,CRS}(m)$ denotes the interference and SIR estimated using the CRS and corresponding to the RB for the particular REG, respectively. Further, $\tau_{unused}$ is a defined threshold used by the processing circuit 40 at the apparatus 12 to detect when the REG in question includes a control-symbol transmission.

To better appreciate this processing, consider that control-symbol transmissions in the control region use one or more groups of four symbols, i.e., REGs, and the apparatus 12 needs to determine which REGs it can use for obtaining pseudo-pilot symbols and thus has to find the REGs which are detected as having transmitted control symbols in them. For each such REG, the apparatus 12 generates a channel estimate based on averaging over the four symbols contained in the REG. The index j indexes each REG processed by the apparatus 12 and the detailed processing implemented by the processing circuit 40 in this regard includes a summing operation that spans a multiple of REGs, to take all relevant samples into account—e.g., see equation 10.

At this point within the overall processing algorithm, the apparatus 12 has generated or otherwise obtained channel samples and channel estimates based on the control region, for the own-cell signal 16 and for the one or more other-cell signals 22 selected for such processing—e.g., the one or more strongest other-cell signals 22. The apparatus 12 can therefore estimate the supplemental covariance matrices, determining fitting weights for them, and use the weighted supplemental covariance matrices to determine an improved estimate of the other-cell covariance matrix $R_{other}$ and thereby obtain a better estimate of the overall covariance matrix R and in turn a better estimate of the combining weights W for equalization processing of the own-cell signal 16.

To do so, the apparatus 12 builds the set of supplemental covariance matrices so as to reflect different interference scenarios, also referred to as interference hypotheses. In one or more embodiments, the set of supplemental covariance matrices covers all possible combinations of other cells 26 explicitly considered as interfering cells and other cells 26 that are not explicitly identified as strong interferers. This means that multiple covariance matrices will be produced.

For example, assume that the apparatus 12 has identified two strong interfering other-cell signals 22 and selected them as selected other-cell signals 22, for use in estimating the set of supplemental covariance matrices. Of course, there may be a number of additional other-cell signals 22 that interfere to some extent with the own-cell signal reception at the apparatus 12, but these remaining other-cell signals 22 are treated as noise.

Thus, the apparatus 12 estimates the set of supplemental covariance matrices as a function of the pseudo-pilot symbols obtained with respect to the two selected other-cell signals 22. However, to account for the fact that the control region based covariance estimation may or may not accurately reflect the covariance seen in the data region, the apparatus 12 estimates the set of supplemental covariance matrices to account for the different interference scenarios that are possible. That is, the covariance determined for each selected other-cell signal 22 is generated from control-region samples and thus may or may not accurately characterize the covariance associated with the selected other-cell signal 22, in dependence on whether the other-cell signal 22 has data region transmissions in it. If so, the other-cell signal 22 is an interferer with respect to the data region of the own-cell signal 16. If not, the other-cell signal 22 is a non-interferer with respect to the own-cell signal 16. The different interference hypotheses account for both possibilities for each selected other-cell signal 22, and for the overall combination of unique interferer/non-interferer assumptions across all selected other-cell signals 22.

The apparatus 12 is therefore configured to estimate the set of supplemental covariance matrices such that each supplemental covariance matrix represents an estimate of the other-cell covariance $R_{other}$ according to an interference hypothesis regarding whether individual ones of the one or more selected other-cell signals 22 are assumed to be an interferer or a non-interferer with respect to the data region of the own-cell signal 16.

For two selected other-cell signals 22, as in the above example case, there are three specifically-considered cells at issue: the own cell 20, denoted as Cell 1, and the two other cells 26 associated with the two selected other-cell signals 22. The other cells 26 are denoted as Cell 2 and Cell 3, respectively. The apparatus 12 thus considers the following interference hypotheses for the data region of the own-cell signal 16:

(a)—interference comes from both Cell 2 and Cell 3, plus from all other cells 26 that were not identified as strong interferers—i.e., not selected for explicit consideration in supplemental covariance matrix generation;

(b)—interference comes from Cell 2 but not Cell 3, plus from all other cells 26 that were not identified as strong interferers;

(c)—interference comes from Cell 3 but not Cell 2, plus from all other cells 26 that were not identified as strong interferers; and (d)—interference comes only from all the other cells 26 that were not identified as strong interferers, i.e., both Cells 2 and 3 are assumed to be non-interferers with respect to the data region of the own-cell signal 16.

Mathematically, the above four cases can be processed in the apparatus 12 based on the following definitions and formulations. Let each supplemental covariance matrix be denoted as $R_{\{x\},\{y\}}$, where "x" denotes the selected other cell(s) 26 whose contributions are removed from the received signal r(k,l) before computing the covariance values comprising $R_{\{x\},\{y\}}$, and where "y" denotes the selected other cell(s) 22 whose contributions are not removed. Thus, the covariance "seen" in $R_{\{x\},\{y\}}$ depends on the "y" cells 14 but not on the "x" cells 14. In other words, "x" denotes the selected other-cell signals 22 that are assumed to be non-interferers with respect to the data region of the own-cell signal 16, while "y" denotes the selected other-cell signals 22 that are assumed to be interferers with respect to the data region of the own-cell signal 16.

For the interference hypothesis denoted as (a) in the above listing of example interference hypotheses (a)-(d), the corresponding supplemental covariance matrix in the set of supplemental covariance matrices is expressed as $R_{\{1\},\{2,3\}}$, i.e., both Cells 2 and 3 are assumed to be interferers with respect to the data region of the own-cell signal 16. Thus, to form $R_{\{1\},\{2,3\}}$ the apparatus 12 takes the corresponding control-region samples of the received signal r(k,l) and removes from them the own-cell contributions of Cell 1, and then computes the covariance seen in those modified received signal samples across the antennas 30. This covariance reflects noise and/or interference from Cell 2 and Cell 3 and, of course, any other cell(s) 26 not specifically considered in the generation of the set of supplemental covariance matrices.

For the interference hypothesis denoted as (b) in the above listing, the supplemental covariance matrix is expressed as $R_{\{1,2\},\{3\}}$, i.e., Cell 2 is assumed to be an interferer with respect to the data region of the own-cell signal 16 and Cell 3 is assumed to be a non-interferer. Thus, to form $R_{\{1,2\},\{3\}}$ the apparatus 12 takes the corresponding control-region samples of the received signal r(k,l) and removes from them the own-cell contributions of Cell 1 and the other-cell contributions of Cell 3, and then computes the covariance seen in those modified received signal samples across the antennas 30.

For the interference hypothesis denoted as (c) in the above listing, the supplemental covariance matrix is expressed as $R_{\{1,2\},\{3\}}$, i.e., Cell 3 is assumed to be an interferer with respect to the data region of the own-cell signal 16 and Cell 2 is assumed to be a non-interferer. Thus, to form $R_{\{1,2\},\{3\}}$ the apparatus 12 takes the corresponding control-region samples of the received signal r(k,l) and removes from them the own-cell contributions of Cell 1 and the other-cell contributions of Cell 2, and then computes the covariance seen in those modified received signal samples across the antennas 30.

For the interference hypothesis denoted as (d) in the above listing, the supplemental covariance matrix is expressed as $R_{\{1,2,3\},\{\ \}}$, i.e., Cells 2 and 3 are assumed to be non-interferers with respect to the data region of the own-cell signal 16. Thus, to form $R_{\{1,2,3\},\{\ \}}$ the apparatus 12 takes the corresponding control-region samples of the received signal r(k,l) and removes from them the own-cell contributions of Cell 1 and the other-cell contributions of Cells 2 and 3, and then computes the covariance seen in those modified received signal samples across the antennas 30. This will be understood as capturing just the covariance associated with the other-cell signals 22 that were not selected for use in supplemental covariance matrix generation.

It will be appreciated that the above processing may be done on a TTI or subframe basis, e.g., on buffered samples of r(k,l) for a given TTI or subframe. Further, it will be appreciated that the samples of the received signal r(k,l) used for computing covariance may be the same control-region samples from which the corresponding pseudo-pilot symbols were estimated.

Furthermore, for all REG considered in the averaging, the power of the REG from cell 2 is non-zero. Similarly, using $R_{\{1,\},\{2,3\}}$ as an example supplemental covariance matrix in the set of supplemental covariance matrices, Cell 2 and Cell 3 are assumed to have non-zero power for the REGs considered in the averaging used to generate the supplemental covariance matrix.

Now consider further details regarding the definition of the supplemental covariance matrices, where $R_{\{1,3\},\{2\}}$ serves as a working example. Again, $R_{\{1,3\},\{2\}}$ represents the interference hypothesis in which Cell 3 is assumed to be a non-interferer with respect to the data region of the own-cell signal 16, while Cell 2 is assumed to be an interferer. Thus, the received signal samples used to determine $R_{\{1,3\},\{2\}}$ are modified in that the contributions of Cells 1 and 3 are removed, leaving other-cell covariance associated with Cell 2, and, of course, the remaining other cell(s) 22 not specifically considered in the supplemental covariance matrix generation.

According to a working definition, $R_{\{1,3\},\{2\}}$ may be expressed as $$R_{\{1,3\},\{2\}} = \frac{1}{4 \cdot |I_{\{2\}}|} \sum_{m \in I_{\{2\}}} \sum_{k,l \in REG_m} \tilde{r}(k,l)\tilde{r}(k,l)^H, \quad (10)$$

where $$\tilde{r}(k,l) = \quad (11)$$
$$r(k,l) - \hat{h}_{1,CCH}(m)Pr_1(k,l)\tilde{d}_1(k,l) - \hat{h}_{3,CCH}(m)Pr_3(k,l)\tilde{d}_3(k,l)$$

Here, m indicates the specific REG used, k, l∈$REG_m$ means that only those REs contained in REG number m are used, and $I_{\{2\}}$ is the set of REGs where the power of the channel estimates for Cell 2 are larger than a defined detection threshold. That is, where $|\hat{h}_{1,CCH}(m)|^2 > \tau_{unused}$. Further, the notation $|I_{\{2\}}|$ means the number of elements in the set $I_{\{2\}}$. In instances where there are zero elements in the set, the supplemental covariance matrix $R_{\{1,3\},\{2\}}$ would be defined as zero.

Substantially the same processing can be used to determine the supplemental covariance matrices for the other interferer and non-interferer assumptions, where the different combinations of those assumptions represent the different interference hypotheses. Also, filtering of the supplemental covariance matrices can be done over time and frequency. However, in embodiments of the apparatus 12 that apply filtering, the processing circuit 40 is configured to limit the averaging interval used for filtering, such that the propagation channel(s) are constant or substantially constant over the averaging interval. For example, a 1/16 filtering may be used, wherein the filter coefficient is set so new covariance estimates are added to the existing filtered covariance estimate with a 1/16 weighting. Also, as noted, the control region is not subject to precoder changes from TTI to TTI, as can happen in the data region, so there is no change in the color of the noise seen in the control region as a consequence of changing data-region precoding.

Extension of the above process to additional other cells 14 is straightforward, and the apparatus 12 may be configured to select any number of other cells 26 for explicit consideration in the interference hypotheses on which the set of supplemental covariance matrices is based. In general, there will be as many supplemental covariance matrices in the set as there are unique combinations of interferer and non-interferer assumptions for the other cells 26 selected for consideration.

Regardless of the number of other cells 26 considered, the apparatus 12 advantageously compensates or otherwise adjusts the set of supplemental covariance matrices, so that the $R_{other}$ covariance matrix is a better reflection of the actual covariance in the data region of the own-cell signal 16. In one approach, the apparatus 12 computes a signal correlation matrix over the REs in the PRB pair where the Physical Downlink Shared Channel, PDSCH, is transmitted. This matrix may be expressed as $$R_{corr} = \frac{1}{|N_{data}|} \sum_{k,l \in Data} r(k,l)r(k,l)^H \quad (12)$$

Here, $N_{data}$ is the number of data-region resource elements or REs that are available and have been selected for the set "Data" for calculating the signal correlation matrix $R_{corr}$.

The apparatus 12 then performs a fitting process, in which the model of covariance, including the set of supplemental covariance matrices, is fitted against the signal correlation matrix $R_{corr}$. This fitting process can be understood as compensating the set of supplemental covariance matrices for the fact that they were developed with respect to the control region instead of the data region, when what is actually needed is a good estimation of the covariance of the own-cell signal 16 in the data region. Thus, the apparatus 12 uses a fitting process to fit the set of supplemental covariance matrices to the measured signal correlation matrix $R_{corr}$. By properly weighting together the set of supplemental covariance matrices in a linear combination, the apparatus 12 obtains an other-cell covariance matrix $R_{other}$ that better reflects the general statistical properties or color of noise in the data region.

To simplify a discussion of the algorithmic processing undertaken by the apparatus 12, assume that there is only one interfering other-cell signal 22 selected for consideration, i.e., only one other cell 26 being expressly considered in the generation of the set of supplemental covariance matrices. Let Cell 1 denote the own cell 20 and let Cell 2 denote the other cell 26 corresponding to the other-cell signal 22 selected for consideration.

In the context of this simplified example, the apparatus 12 in one embodiment is configured to find the fitting weights $w_m$ to minimize $$|R_{corr} - (\hat{H}_1(k,l)Pr_1)(\hat{H}_1(k,l)Pr_1)^H - w_1 R_{\{1,2\},\{\}} - w_2 R_{\{1\},\{2\}} - w_3 R_{CRS} - w_4 R_{DMRS}|^2 \quad (13)$$

The equation (13) can be understood as fitting a model of the overall covariance seen in received signal samples between respective ones of the receive antennas 30, where the model includes a number of individual terms. The first term, $(\hat{H}_1(k,l)Pr_1)(\hat{H}_1(k,l)Pr_1)^H$ represents the own-cell covariance—Cell 1—and is not weighted. The $\hat{H}_1$ values represent own-cell channel estimates, e.g., obtained from CRS and/or DMRS in the own-cell signal 16.

As this example is based on only one other-cell signal 22 selected for consideration, i.e., the Cell 2 signal, the set of supplemental matrices includes two matrices. Namely, a first supplemental covariance matrix denoted as $R_{\{1,2\},\{\}}$ and corresponding to the assumption that Cell 2 is a non-interferer with respect to the data region of the own-cell signal 16, and a second supplemental covariance matrix denoted as $R_{\{1\},\{2\}}$ and corresponding to the assumption that Cell 2 is an interferer with respect to the data region of the own-cell signal 16, at least with respect to the transmission interval at issue.

The $R_{\{1,2\},\{\}}$ term is weighted by fitting weight $w_1$ and the $R_{\{1\},\{2\}}$ term is weighted by fitting weight $w_2$. Further, one sees in equation (13) that the "first covariance matrix" is represented by two matrices, $R_{CRS}$ as determined from CRS in the received signal, and $R_{DMRS}$ as determined from DMRS in the data region of the own-cell signal 16. The $R_{CRS}$ term is weighted by fitting weight $w_3$ and the $R_{DMRS}$ term is weighted by fitting weight $w_4$.

The fitting process represented in equation (13) can thus be understood as arriving at a set of values for the fitting weights $w_1$, $w_2$, $w_3$, and $w_4$ that best "match" the linear combination of the $R_{CRS}$, $R_{DMRS}$, $R_{\{1,2\},\{\ \}}$, and $R_{\{1\},\{2\}}$ terms to the observed signal correlations in the signal correlation matrix $R_{corr}$. Each one of these terms ultimately can be understood as a candidate representation for the other-cell covariance $R_{other}$ and the fitting processing can be understood as weighting these candidate terms according to how well they individually characterize the actual noise and/or interference in the data region of the own-cell signal 16, as seen from $R_{corr}$. Consequently, the weighted linear combination represents, in an overall sense, a better representation of $R_{other}$ than would have been obtained using only CRS and/or DMRS.

To better appreciate this weighting process, assume that Cell 2 actually is an interferer with respect to the data region of the own-cell signal 16 for the transmission interval of interest. As such, the $R_{\{1\},\{2\}}$ interference hypothesis is "correct" and the $R_{\{1,2\},\{\ \}}$ hypothesis is "incorrect". The fitting process therefore would, as a generalized proposition, result in the fitting weight for the $R_{\{1\},\{2\}}$ term having a greater magnitude than the fitting weight for the $R_{\{1,2\},\{\ \}}$ term. That disparity in weighting can be understood as emphasizing the more accurate interference hypotheses and de-emphasizing the inaccurate interference hypotheses. More generally, the weighting of each individual supplemental covariance matrix is driven up or down in dependence on how well it characterizes the actual data-region noise and/or interference of the own-cell signal 16.

After solving for the weights $w_m$ in equation (13), the apparatus 12 can treat the weighted sum, $w_1 R_{\{1,2\},\{\ \}} + w_2 R_{\{1\},\{2\}}$ as representing a scaled version of $R_{other}$. See equation (4) for reference. Also, note that the directly-observed $R_{corr}$ is useful in the above fitting process, but in general it is a noisy or otherwise poor characterization of the data-region noise and/or interference. The above processing puts $R_{corr}$ to advantageous use in determining the fitting weights to obtain a more accurate model of $R_{other}$, using a weighted linear combination of covariance matrices determined from actual pilot symbols, as supplemented by the set of supplemental covariance matrices determined from pseudo-pilot symbols.

Ideally the fitting weights should be computed over each PRB pair, because this is the smallest time and frequency unit where the statistical properties or color of the noise stays constant. However, in practice it is sufficient to model the general direction of the interference and the same fitting weights could therefore be assumed over the bundling size, e.g., one to three resource blocks in the frequency direction, depending on the bandwidth. More generally, the fitting weights could be determined over the frequency granularity of the Channel State Information, CSI, reports generated and set from the apparatus 12.

Of course, it is recognized herein that a given apparatus 12 may not be allocated resources over all resource blocks at issue in the CSI reporting, and instead may be allocated only a few of them. But that possibility is not an overly significant concern in most cases, especially for data transmissions that occupy a large portion the resource blocks. Notably, the larger the region in time and frequency domains where the fitting weights can be assumed constant, the better the estimation accuracy of the weights, because the larger domain(s) yield a greater sample set size for estimating the supplemental covariance matrices.

Once the apparatus 12 computes the fitting weights, it forms the final covariance matrix R for the data region of the resource block pair carrying the own-cell signal 16 as $$R(k,l) = (\hat{H}_1(k,l)Pr_1)(\hat{H}_1(k,l)Pr_1)^H + w_1 R_{\{1,2\},\{\ \}} + w_2 R_{\{1\},\{2\}} + w_3 R_{CRS} + w_4 R_{DMRS} \qquad (14)$$

In another embodiment of the apparatus 12, or another, selectable operating mode, the processing circuit 40 is configured to use another approach to determining the fitting weights. This approach is based on the assumption that $R_{CRS}$ and/or $R_{DMRS}$ model the data-region covariance sufficiently well to use as the basis for determining fitting weights $w_m$ for the set of supplemental covariance matrices. According to this alternative approach, the fitting weight algorithm contemplated herein is modified so that the apparatus 12 determines the fitting weights $w_m$ by minimizing $$|R_{CRS/DMRS} - w_1 R_{\{1,2\},\{\ \}} - w_2 R_{\{1\},\{2\}}|^2 \qquad (15)$$

Regardless of the particular fitting process implemented by the apparatus 12, once the fitting weights $w_m$ have been calculated by the apparatus 12, it forms the final covariance matrix R for the data region of the resource block pair as $$R(k,l) = (\hat{H}_1(k,l)Pr_1)(\hat{H}_1(k,l)Pr_1)^H + \hat{w}_1 R_{\{1,2\},\{\ \}} + \hat{w}_2 R_{\{1\},\{2\}} + b R_{CRS} + c R_{DMRS} \qquad (16)$$

Here, the weights $w_1 = a \cdot w_1$ and $w_2 = a \cdot w_2$ and the apparatus 12 is configured to select or otherwise compute a, b, c such that $a+b+c=1$, which means that the power of the noise is kept unchanged. It will be appreciated that equation (16) would have more terms if more other-cell signals 22 were selected for explicit consideration in the generation of the supplemental covariance matrices.

Equation (16) can also be expressed as $$R(k,l) = (\hat{H}_1(k,l)Pr_1)(\hat{H}_1(k,l)Pr_1)^H + a(w_1 R_{\{1,2\},\{\ \}} + w_2 R_{\{1\},\{2\}}) + b R_{CRS} + c R_{DMRS}.$$

The more weight the apparatus 12 puts to one of the weighting factors a, b, and c, the more emphasis it places on the covariance estimate weighted by that factor. In one or more embodiments, the apparatus 12 is configured to set each of a, b, and c to one-third (⅓). Of course, when more than one other-cell signal 22 is considered in the generating the set of supplemental covariance matrices, there will be more weighting factors, e.g., a, b, c, d, etc., and a similar equal division of weights may be used, e.g., ¼, ⅕, etc.

In other embodiments, the apparatus 12 makes each weighting factor proportional to the number of the samples in the resource block or RB that was used to generate the corresponding covariance matrices. That is, let $N_{control}$, $N_{CRS}$, $N_{DMRS}$ be the total numbers of REs in each RB for the control region, and for the CRS and the DMRS. The apparatus 12 therefore would set a as $$a = \frac{N_{control}}{N_{control} + N_{CRS} + N_{DMRS}}$$

and would similarly determine the b and c scaling factors.

The apparatus 12 may also be configured to assume or otherwise determine that the quality of the samples generated from the control region is sub-par with respect to the samples derived from the CRS and DMRS. That is, the apparatus 12 presumes that its pseudo-pilot based covariance estimates are inferior to the pilot-based estimates of covariance. In such embodiments, the apparatus 12 scales down the weighting factor a by some constant amount. One way to measure the quality deficiency is by averaging the $S/R_{j,CCH}(m)$ computed in equation (9) and mapping the result to a look-up table that penalizes the magnitude of the weighting factor a, in dependence on the size of the average. The lower the SIR, the smaller the weighting factor a.

It is also recognized herein that the above teachings apply to signals 22 involving E-PDCCH transmissions, where E-PDDCH denotes the Enhanced Physical Downlink Control Channel introduced in Release 11 of the 3GPP specifications for LTE. The E-PDCCH occupies resources allocated from the data region, and can be used to obtain pseudo-pilot symbols for generation of the above-described supplemental covariance matrices.

Figure 7:
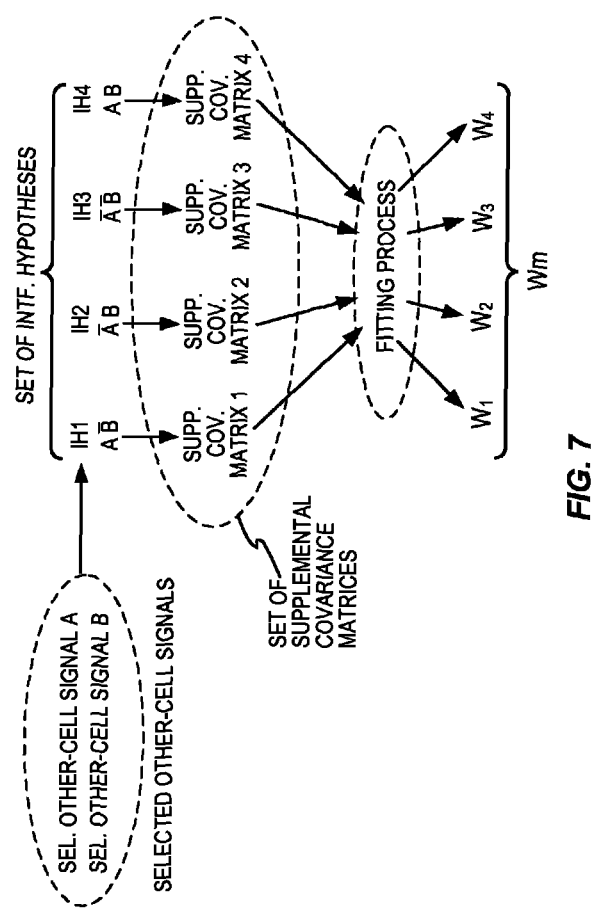
FIG. 7 is a data flow diagram illustrating example equalization processing and resulting values according to one embodiment of equalization processing contemplated herein.

Broadly, the teachings herein enable the use of pseudo-pilot symbols for generating an improved overall covariance matrix R used for generating combining weights W, which in turn may be used for data demodulation of a desired signal, e.g., the own-cell signal 16. See FIG. 7, for an example processing flow. The received composite signal 14 includes some number of other-cell signals 22 and two are selected as other-cell signals A and B. Pseudo-pilot symbols obtained from the control region of the other-cell signals A and B are used to obtain a set of supplemental covariance matrices. Each supplemental covariance matrix represents an estimate of other-cell covariance for a given interference hypothesis.

For the selected two other-cell signals A and B, there are four interference hypotheses, denoted as IH1, IH2, IH3, and IH4. IH1 is defined as $A\bar{B}$, meaning that other-cell signal A is assumed to be an interferer with respect to the data region of the own-cell signal 16, whereas the "bar" indicates that the other-cell signal B is assumed to be a non-interferer. With this notation in mind, IH2 is defined as $\bar{A}B$, IH3 is defined as $\bar{A}\bar{B}$ and IH4 is defined as AB. The set of supplemental covariance matrices therefore includes matrix 1 corresponding to IH1, matrix 2 corresponding to IH2, matrix 3 corresponding to IH3, and matrix 4 corresponding to IH4. In turn, these four matrices are fitted to determine the fitting weights $w_m$, as taught herein, where these fitting weights include fitting weight w1 for matrix 1, w2 for matrix 2, w3 for matrix 3, and w4 for matrix 4.

These fitted supplemental covariance matrices are then used to obtain a better estimate of $R_{other}$ as taught above, and, correspondingly, a better estimate of the overall covariance matrix R. This in turn provides more steady combining weights for own-cell signal equalization, resulting in better throughput performance, as compared to conventional estimation of covariance based only on a smaller set of actual pilot symbols. The approach taught herein relies on "decomposing" the covariance matrix via the estimation of supplemental covariance matrices, which are terms or components based on the control region and determined from the pseudo-pilot symbols. These components are fitted to data region correlations, to thereby obtain more accurate covariance matrix for the data region, and that more accurate covariance matrix is used in the derivation of the combining weights used for own-cell signal quality estimation and/or own-cell signal demodulation.

Notably, modifications and other embodiments of the disclosed invention(s) will come to mind to one skilled in the art having the benefit of the teachings presented in the foregoing descriptions and the associated drawings. For example, the apparatus 12 may be configured to use CRS as an alternative or in addition to the use of pseudo-pilots symbols, at least in cases where the CRS overlap between different cells, e.g., the own-cell CRS in the own cell 20 are overlapped by the other-cell CRS in one or more of the other cells 26. In such cases, the interference seen in the own-cell CRS resource elements reflects other-cell interference that may or may not be seen in the own-cell data region, which is also true for the pseudo-pilot symbols. Thus, the apparatus 12 in some embodiments is configured to use these overlapped CRS in place of pseudo-pilot symbols. In such embodiments, the apparatus 12 performs the aforementioned estimating (Block 604) using just the DMRS, to obtain the first covariance matrix representing the noise and interference covariance in the data region of the own-cell signal.

In more detail, in such embodiments, the apparatus 12 is configured to perform equalization processing for the own-cell signal 16, based on receiving a composite signal 14 that includes synchronized own-cell and other-cell signals 16, 22 having a control region and a data region, and generating a first covariance matrix from dedicated pilot symbols in the data region of the own-cell signal 16. This first covariance matrix, i.e., $R_{DMRS}$, characterizes noise and/or interference from the other-cell signals 22 and formed using data-region pilots which are dedicated to the apparatus 12 and which reflect actual interference and noise seen in the data region of the own-cell signal 16 with respect to the other-cell signals 22.

The apparatus 12 is further configured to generate the set of supplemental covariance matrices from common pilots, i.e., CRS, in the control and/or data regions of the own-cell signal 16, where the common pilots are overlapped by common pilots in a selected one or more of the other-cell signals 22 and where each supplemental covariance matrix characterizes noise and/or interference from the other-cell signals 22 according to a corresponding interference hypothesis regarding whether individual ones of the one or more selected other-cell signals 22 are assumed to be an interferer or a non-interferer with respect to the data region of the own-cell signal 16.

In other words, an own-cell CRS that is overlapped by an other-cell CRS in an other cell 26 can be used by the apparatus 12 to estimate covariance associated with that other cell 26 in much the same manner as the control-symbol based processing taught earlier.

CRS overlap can be known from reading the broadcast channel(s) of the interfering other cells 26. Broadly, in the case of overlapping CRS, the set of pseudo-pilot symbols can be understood as being derived from control-channel symbols as described in detail above, and the overlapped CRS, which can be viewed as simply another REG or REGs to be used in obtaining the pseudo-pilot symbol set used for supplemental covariance matrix generation. When CRS do not overlap, the pseudo-pilot set is based only on control symbols.

Then, as before in the context of pseudo-pilot based processing, the apparatus 12 is configured to determine a set of fitting weights that best fit a linear combination of the set of supplemental covariance matrices to the first covariance matrix, or to a signal correlation matrix calculated from data-region samples of the received composite signal 14, and to form an overall covariance matrix as a linear combination of an estimated own-cell covariance matrix and an other-cell covariance matrix comprising a weighted linear combination of the first and supplemental covariance matrices that uses weighting factors determined as a function of the fitting weights, calculate combining weights for the own-cell signal 16 as a function of the overall covariance matrix, and use the combining weights for equalizing the own-cell signal 16.

Thus, it will be understood that the apparatus 12 as contemplated herein obtains a set of pseudo-pilot symbols and uses that set to generate supplemental covariance matrices, for improved characterization of other-cell noise and/or interference in the generation of combining weights. In some embodiments, the apparatus 12 obtains the set of pseudo-pilot symbols from control symbols transmitted in the control region of the own-cell signal 16 and one or more selected other-cell signals 22. In other embodiments, the apparatus 12 obtains the set of pseudo-pilot symbols from own-cell CRS that are overlapped by other-cell CRS. In still other embodiments, the apparatus 12 obtains the set of pseudo-pilot symbols using both control symbols and overlapped CRS, at least when the apparatus 12 knows that the overlap condition exists.

Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of equalization processing in a wireless communication apparatus configured for operation in a cellular communication network, said method comprising:
   receiving a composite signal that includes synchronized own-cell and other-cell signals having a control region and a data region;
   generating a first covariance matrix, from pilot symbols in the own-cell signal, characterizing noise and/or interference from the other-cell signals;
   obtaining pseudo-pilot symbols from control symbols conveyed in the control region of the own-cell signal and one or more selected ones of the other-cell signals;
   generating a set of supplemental covariance matrices from the pseudo-pilot symbols, each characterizing noise and/or interference from the other-cell signals according to a corresponding interference hypothesis regarding whether individual ones of the one or more selected other-cell signals are assumed to be an interferer or a non-interferer with respect to the data region of the own-cell signal;
   determining a set of fitting weights that best fit a linear combination of the set of supplemental covariance matrices to the first covariance matrix, or to a signal correlation matrix calculated from data-region samples of the received composite signal;
   forming an overall covariance matrix as a linear combination of an estimated own-cell covariance matrix and an other-cell covariance matrix comprising a weighted linear combination of the first and supplemental covariance matrices that uses weighting factors determined as a function of the fitting weights;
   calculating combining weights for the own-cell signal as a function of the overall covariance matrix; and
   using the combining weights for equalizing the own-cell signal.

2. The method of claim 1, further comprising selecting the one or more selected other-cell signals as the strongest one or a number of strongest ones, among a plurality of other-cell signals in the received composite signal.

3. The method of claim 1, wherein there are as many interference hypotheses and, consequently, as many supplemental covariance matrices, as there are unique combinations of interferer and non-interferer assumptions for the one or more selected other-cell signals.

4. The method of claim 1, wherein estimating the set of supplemental covariance matrices comprises, for each supplemental covariance matrix, estimating signal contributions arising from the pseudo-pilot symbols of each selected other-cell signal that is assumed to be a non-interferer in the corresponding interference hypothesis, removing the signal contributions from corresponding samples of the received composite signal to obtain interference-suppressed samples, and computing the supplemental covariance matrix from the interference-suppressed samples.

5. The method of claim 4, further comprising generating channel estimates relating each receiver antenna to each selected other-cell signal, and wherein estimating the signal contributions arising from the pseudo-pilot symbols of each selected-other signal that is assumed to be a non-interferer in the corresponding interference hypothesis comprises applying the corresponding channel estimates to the pseudo-pilot symbols.

6. The method of claim 1, wherein determining the set of fitting weights comprises solving for the fitting weights in a least-squares fitting process in which the first covariance matrix and each supplemental covariance matrix are weighted terms that each have a corresponding fitting weight, and wherein the fitting weights are adjusted to minimize the difference between the signal correlation matrix and the sum of the weighted terms.

7. The method of any of claim 1, wherein determining the set of fitting weights comprises solving for the fitting weights in a least-squares fitting process in which each supplemental covariance matrix is a weighted term having a corresponding fitting weight, and wherein the fitting weights are adjusted to minimize the difference between the first covariance matrix and the sum of the weighted terms.

8. The method of claim 1, wherein the first covariance matrix comprises one or both of a covariance matrix determined as a function of common reference symbols in the own-cell signal and which are not targeted to the apparatus via pre-coding, and a covariance matrix determined as a function of demodulation reference symbols transmitted in the data region of the own-cell signal and which are targeted to the apparatus via pre-coding.

9. The method of claim 1, wherein the weighting factors are scaled to sum to unity.

10. The method of claim 1, wherein the received composite signal represents a physical resource block pair, each physical resource block comprising a plurality of resource elements, and wherein the weighting factors are determined as a function of the fitting weights, based on scaling each fitting weight as a function of the total number of the resource elements within the physical resource block pair that are associated with the supplemental covariance matrix corresponding to the fitting weight.

11. The method of claim 1, wherein the weighting factors are determined as a function of the fitting weights, based on scaling the fitting weights as a function of signal quality estimated for the one or more selected other-cell signals.

12. A wireless communication apparatus configured for operation in a cellular communication network, said apparatus comprising:
   a communication transceiver operatively associated with two or more receiver antennas and configured to receive a composite signal that includes synchronized own-cell and other-cell signals having a control region and a data region; and
   a processing circuit operatively associated with the communication transceiver and configured to:
      generate a first covariance matrix, from pilot symbols in the own-cell signal, characterizing noise and/or interference from the other-cell signals;
      obtain pseudo-pilot symbols from control symbols conveyed in the control region of the own-cell signal and one or more selected ones of the other-cell signals;
      generate a set of supplemental covariance matrices from the pseudo-pilot symbols, each characterizing noise and/or interference from the other-cell signals according to a corresponding interference hypothesis regarding whether individual ones of the one or more selected other-cell signals are assumed to be an interferer or a non-interferer with respect to the data region of the own-cell signal;

determine a set of fitting weights that best fit a linear combination of the set of supplemental covariance matrices to the first covariance matrix, or to a signal correlation matrix calculated from data-region samples of the received composite signal;

form an overall covariance matrix as a linear combination of an estimated own-cell covariance matrix and an other-cell covariance matrix that comprises a weighted linear combination of the first and supplemental covariance matrices that uses weighting factors determined as a function of the fitting weights;

calculate combining weights for the own-cell signal as a function of the overall covariance matrix; and use the combining weights for equalizing the own-cell signal.

13. The apparatus of claim 12, wherein the processing circuit is configured to select the one or more selected other-cell signals as the strongest one or a number of strongest ones, among a plurality of other-cell signals in the received composite signal.

14. The apparatus of claim 12, wherein there are as many interference hypotheses and, consequently, as many supplemental covariance matrices, as there are unique combinations of interferer and non-interferer assumptions for the one or more selected other-cell signals.

15. The apparatus of claim 12, wherein the processing circuit is configured to estimate the set of supplemental covariance matrices by, for each supplemental covariance matrix, estimating signal contributions arising from the pseudo-pilot symbols of each selected other-cell signal that is assumed to be a non-interferer in the corresponding interference hypothesis, removing the signal contributions from corresponding samples of the received composite signal to obtain interference-suppressed samples, and computing the supplemental covariance matrix from the interference-suppressed samples.

16. The apparatus of claim 15, wherein the processing circuit is configured to generate channel estimates relating each receiver antenna to each selected other-cell signal, and to estimate the signal contributions arising from the pseudo-pilot symbols of each selected-other signal that is assumed to be a non-interferer in the corresponding interference hypothesis, by applying the corresponding channel estimates to the pseudo-pilot symbols.

17. The apparatus of claim 12, wherein the processing circuit is configured to:

determine the set of fitting weights by solving for the fitting weights in a least-squares fitting process, wherein the first covariance matrix and each supplemental covariance matrix are weighted terms that each have a corresponding fitting weight; and adjust the fitting weights to minimize the difference between the signal correlation matrix and the sum of the weighted terms.

18. The apparatus of claim 12, wherein the processing circuit is configured to:

determine the set of fitting weights by solving for the fitting weights in a least-squares fitting process, wherein each supplemental covariance matrix is a weighted term having a corresponding fitting weight; and adjust the fitting weights to minimize the difference between the first covariance matrix and the sum of the weighted terms.

19. The apparatus of claim 12, wherein the first covariance matrix comprises one or both of a covariance matrix determined as a function of common reference symbols transmitted in the own-cell signal and which are not targeted to the apparatus via pre-coding, and a covariance matrix determined as a function of demodulation reference symbols transmitted in the data region of the own-cell signal and which are targeted to the apparatus via pre-coding.

20. The apparatus of claim 12, wherein the processing circuit is configured to scale the weighting factors to sum to unity.

21. The apparatus of claim 12, wherein the received composite signal represents a physical resource block pair, each physical resource block comprising a plurality of resource elements, and wherein the processing circuit is configured to determine the weighting factors as a function of the fitting weights, by scaling each fitting weight as a function of the total number of the resource elements within the physical resource block pair that are associated with the supplemental covariance matrix corresponding to the fitting weight.

22. The apparatus of claim 12, wherein the processing circuit is configured to determine the weighting factors as a function of the fitting weights, by scaling the fitting weights as a function of signal quality estimated for the one or more selected other-cell signals.

23. The apparatus of claim 12, wherein the processing circuit comprises:

a covariance estimation circuit configured to estimate the first covariance matrix and the set of supplemental covariance matrices;

an equalization and demodulation circuit configured to obtain the pseudo-pilot symbols, determine the set of fitting weights, form the overall covariance matrix, calculate the combining weights, and use the combining weights to demodulate the data symbols from the data region of the own-cell signal; and a signal quality estimation circuit to use the combining weights to estimate the own-cell signal quality.

24. A method of equalization processing in a wireless communication apparatus configured for operation in a cellular communication network, said method comprising:

receiving a composite signal that includes synchronized own-cell and other-cell signals having a control region and a data region;

generating a first covariance matrix, from dedicated pilot symbols in the data region of the own-cell signal, characterizing noise and/or interference from the other-cell signals;

generating a set of supplemental covariance matrices from common pilot symbols in the control and/or data regions of the own-cell signal, where the common pilot symbols are overlapped by common pilot symbols in a selected one or more of the other-cell signals and where each supplemental covariance matrix characterizes noise and/or interference from the other-cell signals according to a corresponding interference hypothesis regarding whether individual ones of the one or more selected other-cell signals are assumed to be an interferer or a non-interferer with respect to the data region of the own-cell signal;

determining a set of fitting weights that best fit a linear combination of the set of supplemental covariance matrices to the first covariance matrix, or to a signal correlation matrix calculated from data-region samples of the received composite signal;

forming an overall covariance matrix as a linear combination of an estimated own-cell covariance matrix and an other-cell covariance matrix comprising a weighted linear combination of the first and supplemental covariance matrices that uses weighting factors determined as a function of the fitting weights;

calculating combining weights for the own-cell signal as a function of the overall covariance matrix; and using the combining weights for equalizing the own-cell signal.

* * * * *